(12) United States Patent
Khoshnevisan et al.

(10) Patent No.: US 12,295,004 B2
(45) Date of Patent: *May 6, 2025

(54) MULTIPLE DOWNLINK CONTROL INFORMATION (DCI) MESSAGE HANDLING FOR MULTIPLE CONTROL RESOURCE SET (CORESET) GROUPS

(71) Applicant: QUALCOMM Incorporated, San Diego, CA (US)

(72) Inventors: Mostafa Khoshnevisan, San Diego, CA (US); Xiaoxia Zhang, San Diego, CA (US); Wei Yang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/645,157

(22) Filed: Dec. 20, 2021

(65) Prior Publication Data

US 2022/0167326 A1    May 26, 2022

Related U.S. Application Data

(63) Continuation of application No. 17/224,918, filed on Apr. 7, 2021, now Pat. No. 11,206,659, which is a
(Continued)

(51) Int. Cl.
*H04W 72/04*    (2023.01)
*H04L 1/18*    (2023.01)
(Continued)

(52) U.S. Cl.
CPC ........... *H04W 72/23* (2023.01); *H04L 1/1812* (2013.01); *H04L 5/001* (2013.01)

(58) Field of Classification Search
CPC ... H04W 28/04; H04W 72/04; H04W 72/042; H04W 88/08; H04L 5/0007; H04L 1/1812; H04L 5/001
(Continued)

(56) References Cited

U.S. PATENT DOCUMENTS 11,012,994 B2    5/2021    Khoshnevisan et al.
2012/0218963 A1*  8/2012    Kim .............. H04L 1/1896
                                                370/329
(Continued)

FOREIGN PATENT DOCUMENTS

CN    109391422 A    2/2019
CN    110226315 A    9/2019
(Continued)

OTHER PUBLICATIONS

3GPP TSG RAN WG1 Meeting #90, Prague, Czech Republic, Aug. 21-25, 2017, R1-17141161, Agenda Item: 6.1.3.3.43, Source: InterDigital Inc., Title: HARQ feedback design aspects for CBG based transmission. (Year: 2017).*
(Continued)

*Primary Examiner* — Peter G Solinsky
*Assistant Examiner* — Sanjay K Dewan
(74) *Attorney, Agent, or Firm* — Holland & Hart LLP/Qualcomm

(57) ABSTRACT

This disclosure provides systems, methods, and apparatus, including computer programs encoded on computer storage media, for multiple downlink control information (DCI) message handling for multiple control resource set (CORESET) groups. In one aspect, a user equipment (UE) may provide separate or joint feedback for data messages received from different CORESET groups. In some examples, the UE may be configured with code block group (CBG)-based transmissions for a component carrier (CC) or
(Continued)

a CORESET group in a CC. If implementing a dynamic codebook, the UE may track separate transport block (TB)-based and CBG-based downlink assignment indexes (DAIs) for each CORESET group or may track joint TB-based and CBG-based DAIs across the set of CORESET groups to handle the CBG configuration. Additionally, or alternatively, if implementing a semi-static codebook, the UE may apply skipping rules across the set of CORESET groups or separately for each CORESET group to reduce signaling overhead.

30 Claims, 13 Drawing Sheets

Related U.S. Application Data continuation of application No. 17/033,565, filed on Sep. 25, 2020, now Pat. No. 11,012,994.

(60) Provisional application No. 62/910,803, filed on Oct. 4, 2019.

(51) Int. Cl.
    H04L 1/1812    (2023.01)
    H04L 5/00      (2006.01)
    H04W 72/23     (2023.01)

(58) Field of Classification Search
    USPC .......................................................... 370/329
    See application file for complete search history.

(56) References Cited

U.S. PATENT DOCUMENTS

| | | |
|---|---|---|
| 2013/0083681 A1 | 4/2013 | Ebrahimi Tazeh Mahalleh et al. |
| 2013/0308612 A1 | 11/2013 | Cai et al. |
| 2014/0126512 A1 | 5/2014 | Kim et al. |
| 2014/0334419 A1 | 11/2014 | Yang et al. |
| 2017/0208584 A1 | 7/2017 | Qu et al. |
| 2018/0227777 A1 | 8/2018 | Sun et al. |
| 2019/0082431 A1* | 3/2019 | Yi .................... H04W 72/0446 |
| 2019/0103943 A1* | 4/2019 | Wang .................. H04L 1/1854 |
| 2019/0149275 A1 | 5/2019 | He et al. |
| 2019/0149365 A1 | 5/2019 | Chatterjee et al. |
| 2019/0150121 A1 | 5/2019 | Abdoli et al. |
| 2019/0150122 A1 | 5/2019 | Ying et al. |
| 2019/0342035 A1 | 11/2019 | Zhang et al. |
| 2019/0349960 A1 | 11/2019 | Li et al. |
| 2019/0363843 A1 | 11/2019 | Gordaychik |
| 2020/0036480 A1 | 1/2020 | Yang et al. |
| 2020/0120584 A1 | 4/2020 | Yi et al. |
| 2020/0295878 A1* | 9/2020 | Choi .................... H04W 28/04 |
| 2020/0322947 A1 | 10/2020 | Baldemair et al. |
| 2020/0328849 A1 | 10/2020 | Noh et al. |
| 2020/0351129 A1 | 11/2020 | Kwak et al. |
| 2020/0351855 A1 | 11/2020 | Kung et al. |
| 2021/0014931 A1 | 1/2021 | Noh et al. |
| 2021/0143936 A1 | 5/2021 | Zhang et al. |
| 2021/0227521 A1 | 7/2021 | Khoshnevisan et al. |
| 2022/0140954 A1* | 5/2022 | Kim .................... H04L 1/1861 370/329 |
| 2022/0330282 A1* | 10/2022 | Kim .................... H04W 72/23 |

FOREIGN PATENT DOCUMENTS

| | | | | |
|---|---|---|---|---|
| WO | WO-2018228487 A1 | 12/2018 | | |
| WO | WO 2019/051177 A1 * | 3/2019 | ............ | H04W 74/08 |
| WO | WO-2019099569 A1 | 5/2019 | | |

OTHER PUBLICATIONS

3GPP TSG RAN WG1 #97, Reno, USA, May 13-17, 2019, R1-1905953, Title: Discussion on scheduling and HARQ for NR-U, Source: ZTE, Sanechips, Agenda item: 7.2.2.2.3. (Year: 2019).*
3GPP TSG RAN WG1 #96bis, Xi'an, China, Apr. 8-12, 2019, R1-1904096, Source: vivo, Title: Further Discussion on multi-TRP Transmission, Agenda Item: 7.2.8.2. (Year: 2019).*
3GPP TSG RAN WG1 #96bis, Xi'an, China, Apr. 8-12, 2019, R1-1905817, Source: vivo, Title: Further Discussion on Multi-TRP Transmission, Agenda Item: 7.2.8.2. (Year: 2019).*
International Search Report and Written Opinion—PCT/US2020/053096—ISA/EPO—dated Mar. 15, 2021.
Partial International Search Report—PCT/US2020/053096—ISA/EPO—dated Jan. 22, 2021.
U.S. Appl. No. 62/910,803, filed Oct. 4, 2019, 134 Pages.
Vivo: "Further Discussion on Multi-TRP Transmission," 3GPP Draft, 3GPP TSG RAN WG1 #96bis, R1-1904096, Further Discussion on Multi-TRP Transmission, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Mar. 30, 2019 (Mar. 30, 2019), 14 pages, XP051691283, Retrieved from the Internet: URL:http://www.3gpp.org/ftp/tsg%5Fran/WG1%5FRL1/TSGR1%5F96b/Docs/R1%2D1904096%2Ezip [retrieved on Mar. 30, 2019] p. 1 sections 2, 2.4, 5.
Vivo: "Further Discussion on Multi-TRP Transmission", 3GPP Draft, 3GPP TSG RAN WG1 #96bis, R1-1905817, Further Discussion on Multi-TRP Transmission, 3rd Generation Partnership Project (3GPP), Mobile Competence Centre, 650, Route Des Lucioles, F-06921, Sophia-Antipolis Cedex, France, vol. RAN WG1. No. Xi'an, China; Apr. 8, 2019-Apr. 12, 2019, Apr. 15, 2019 (Apr. 15, 2019), XP051707864, 14 Pages, Retrieved from the Internet: URL: http://www.3gpp.org/ftp/tsg%5Fran/WG1%5FRL1/TSGR1%5F96b/Docs/R1%2D1905817%2Ezip [retrieved on Apr. 15, 2019], section 5.
ZTE, et al., "Discussion on Scheduling and HARQ for NR-U", R1-1905953 Scheduling and HARQ, 3GPP TSG RAN WG1 #97, 3GPP Draft, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), 8 Pages, XP051707995, Retrieved from the Internet: URL: http://www.3gpp.org/ftp/tsg%5Fran/WG1%5FRL1/TSGR1%5F97/Docs/R1%2D1905953%2Ezip, http://www.3gpp.org/ftp/tsg%5Fran/WG1%5FRL1/TSGR1%5F97/Docs/R1%2D1905953%2Ezip, [retrieved on May 4, 2019], the Whole Document, Sections 1 and 2.1 Figure 1.
Guangdong OPPO Mobile Telecom: "PDCCH CORESET configuration and UE procedure on NR-PDCCH", 3GPP TSG RAN WG1 NR Ad-Hoc#2, R1-1710150, Qingdao, P.R, China Jun. 27-30, 2017, 8 Pages.
LG Electronics: "Summary on Rel-15 NR CRs for CBG Retransmission", 3GPP TSG RAN WG1 #96bis, R1-1905626, Xi'an, China, Apr. 8-12, 2019, 6 Pages.
Interdigital Inc: "HARQ Feedback Design Aspects for CBG Based Transmission", 3GPP TSG RAN WG1 Meeting #90, R1-1714161, Prague, Czech Republic, Aug. 21, 2017-Aug. 25, 2017, Aug. 12, 2017, pp. 1-4.

* cited by examiner

MULTIPLE DOWNLINK CONTROL INFORMATION (DCI) MESSAGE HANDLING FOR MULTIPLE CONTROL RESOURCE SET (CORESET) GROUPS

CROSS REFERENCE

This Patent Application is a Continuation of U.S. patent application Ser. No. 17/224,918 by Khoshnevisan et al., entitled "MULTIPLE DOWNLINK CONTROL INFORMATION (DCI) MESSAGES HANDLING FOR MULTIPLE CONTROL RESOURCE SET (CORESET) GROUPS" filed Apr. 7, 2021, which is a Continuation of U.S. Pat. No. 11,012,994 by Khoshnevisan et al., entitled "MULTIPLE DOWNLINK CONTROL INFORMATION (DCI) MESSAGE HANDLING FOR MULTIPLE CONTROL RESOURCE SET (CORESET) GROUPS," filed Sep. 25, 2020, which claims priority to U.S. Provisional Patent Application No. 62/910,803 by Khoshnevisan et al., entitled "MULTIPLE DOWNLINK CONTROL INFORMATION MESSAGE HANDLING FOR MULTIPLE TRANSMISSION AND RECEPTION POINTS," filed Oct. 4, 2019; each of which is assigned to the assignee hereof. The disclosure of the prior Applications are considered part of and are incorporated by reference in this Patent Application.

TECHNICAL FIELD

This disclosure relates to wireless communications and to multi-downlink control information (mDCI) handling for multiple control resource set (CORESET) groups.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving a configuration for a downlink control channel monitoring occasion including a set of control resource sets (CORESETs), each CORESET being associated with one of a set of CORESET groups and one of a set of downlink component carriers (CCs), receiving one or more downlink control information (DCI) messages in one or more of the set of CORESETs, identifying that one or more of the set of downlink CCs is configured for code block group (CBG)-based transmission, generating, according to a set of sub-codebooks for a dynamic feedback codebook, one or more feedback messages relating to one or more downlink data messages scheduled by the one or more DCI messages, the set of sub-codebooks including at least a first sub-codebook associated with transport block (TB)-based transmission for one or more CORESET groups of the set of CORESET groups and a second sub-codebook associated with CBG-based transmission for the one or more CORESET groups of the set of CORESET groups based on an association between the set of CORESETs, the set of CORESET groups, the one or more of the set of downlink CCs configured for CBG-based transmission, or a combination thereof, and transmitting the one or more feedback messages.

Another innovative aspect of the subject matter described in this disclosure can be implemented in an apparatus for wireless communications. The apparatus may include a first interface, a second interface, and a processing system. The first interface may be configured to obtain a configuration for a downlink control channel monitoring occasion including a set of CORESETs, each CORESET being associated with one of a set of CORESET groups and one of a set of downlink CCs and obtain one or more DCI messages in one or more of the set of CORESETs. The processing system may be configured to identify that one or more of the set of downlink CCs is configured for CBG-based transmission and generate, according to a set of sub-codebooks for a dynamic feedback codebook, one or more feedback messages relating to one or more downlink data messages scheduled by the one or more DCI messages, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups based on an association between the set of CORESETs, the set of CORESET groups, the one or more of the set of downlink CCs configured for CBG-based transmission, or a combination thereof. The second interface may be configured to output the one or more feedback messages.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive a configuration for a downlink control channel monitoring occasion including a set of CORESETs, each CORESET being associated with one of a set of CORESET groups and one of a set of downlink CCs, receive one or more DCI messages in one or more of the set of CORESETs, identify that one or more of the set of downlink CCs is configured for CBG-based transmission, generate, according to a set of sub-codebooks for a dynamic feedback codebook, one or more feedback messages relating to one or more downlink data messages scheduled by the one or more DCI messages, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups based on an association between the set of CORESETs, the set of CORESET groups, the one or more of the set of downlink CCs configured for CBG-based transmission, or a combination thereof, and transmit the one or more feedback messages.

Another innovative aspect of the subject matter described in this disclosure can be implemented in another apparatus for wireless communications at a UE. The apparatus may include means for receiving a configuration for a downlink control channel monitoring occasion including a set of CORESETs, each CORESET being associated with one of a set of CORESET groups and one of a set of downlink CCs, receiving one or more DCI messages in one or more of the set of CORESETs, identifying that one or more of the set of downlink CCs is configured for CBG-based transmission, generating, according to a set of sub-codebooks for a dynamic feedback codebook, one or more feedback messages relating to one or more downlink data messages scheduled by the one or more DCI messages, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups based on an association between the set of CORESETs, the set of CORESET groups, the one or more of the set of downlink CCs configured for CBG-based transmission, or a combination thereof, and transmitting the one or more feedback messages.

Another innovative aspect of the subject matter described in this disclosure can be implemented in a non-transitory computer-readable medium storing code for wireless communications at a UE. The code may include instructions executable by a processor to receive a configuration for a downlink control channel monitoring occasion including a set of CORESETs, each CORESET being associated with one of a set of CORESET groups and one of a set of downlink CCs, receive one or more DCI messages in one or more of the set of CORESETs, identify that one or more of the set of downlink CCs is configured for CBG-based transmission, generate, according to a set of sub-codebooks for a dynamic feedback codebook, one or more feedback messages relating to one or more downlink data messages scheduled by the one or more DCI messages, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups based on an association between the set of CORESETs, the set of CORESET groups, the one or more of the set of downlink CCs configured for CBG-based transmission, or a combination thereof, and transmit the one or more feedback messages.

In some implementations, receiving the one or more DCI messages in the one or more of the set of CORESETs, as implemented in the method, apparatuses, and non-transitory computer-readable medium described herein, can include operations, features, means, or instructions for receiving, in a first CORESET of the downlink control channel monitoring occasion corresponding to a first CORESET group, a first DCI message scheduling a first downlink data message, and receiving, in a second CORESET of the downlink control channel monitoring occasion corresponding to a second CORESET group, a second DCI message scheduling a second downlink data message.

In some implementations, the method, apparatuses, and non-transitory computer-readable medium described herein may further include operations, configurations, features, means, or instructions for determining to transmit joint hybrid automatic repeat request (HARQ) feedback for the first downlink data message corresponding to the first CORESET group and the second downlink data message corresponding to the second CORESET group based on the configuration, and tracking downlink assignment indexes (DAIs) jointly for the first CORESET group and for the second CORESET group based on the configuration. Implementing joint HARQ feedback may decrease overhead signaling when compared to separate HARQ feedback. For example, a single HARQ message corresponding to multiple CORESET groups may be transmitted to a device (such as a base station) as opposed to two or more HARQ messages corresponding to multiple CORESET groups.

In some implementations, the method, apparatuses, and non-transitory computer-readable medium described herein may further include operations, configurations, features, means, or instructions for generating the first sub-codebook for the dynamic feedback codebook based on DCI messages in CCs that may be configured with CORESETs corresponding to the first CORESET group, CORESETs corresponding to the second CORESET group, or both, and generating the second sub-codebook for the dynamic feedback codebook based on DCI messages in CCs that may be configured with CORESETs corresponding to the first CORESET group, CORESETs corresponding to the second CORESET group, or both and configured for CBG-based transmission, where the one or more feedback messages include a joint HARQ message generated based on the first sub-codebook and the second sub-codebook.

In some examples of the method, apparatuses, and non-transitory computer-readable medium described herein, a number of HARQ bits for each counter DAI (cDAI) position in the second sub-codebook may be based on a greatest number of configured CBGs for the CCs that may be configured with CORESETs corresponding to the first CORESET group, CORESETs corresponding to the second CORESET group, or both and configured for CBG-based transmission for the set of CORESET groups.

In some implementations, the method, apparatuses, and non-transitory computer-readable medium described herein may further include operations, configurations, features, means, or instructions for tracking a TB-based cDAI for the set of CORESET groups corresponding to the first sub-codebook, a TB-based total DAI (tDAI) for the set of CORESET groups corresponding to the first sub-codebook, a CBG-based cDAI for the set of CORESET groups corresponding to the second sub-codebook, and a CBG-based tDAI for the set of CORESET groups corresponding to the second sub-codebook.

In some implementations, the method, apparatuses, and non-transitory computer-readable medium described herein may further include operations, configurations, features, means, or instructions for tracking DAIS separately for the first CORESET group and for the second CORESET group based on the configuration.

In some examples of the method, apparatuses, and non-transitory computer-readable medium described herein, the configuration indicates separate HARQ feedback, the one or more feedback messages include a first HARQ message corresponding to the first CORESET group, and the dynamic feedback codebook may include a first dynamic HARQ codebook corresponding to the first CORESET group. In some implementations, the method, apparatuses, and non-transitory computer-readable medium described herein may further include operations, configurations, features, means, or instructions for generating a second HARQ message corresponding to the second CORESET group according to a second dynamic HARQ codebook corresponding to the second CORESET group, and transmitting the second HARQ message in a second uplink resource, where the first HARQ message may be transmitted in a first uplink resource different from the second uplink resource. Implementing separate HARQ feedback may support more granular feedback information because two or more HARQ messages corresponding to multiple CORESET groups may be transmitted to a device (such as a base station) as opposed to one HARQ message corresponding to multiple CORESET groups.

In some implementations, the method, apparatuses, and non-transitory computer-readable medium described herein may further include operations, configurations, features, means, or instructions for generating the first sub-codebook for the first dynamic HARQ codebook based on DCI messages in CCs that may be configured with CORESETs corresponding to the first CORESET group, generating the second sub-codebook for the first dynamic HARQ codebook based on DCI messages in CCs that may be configured with CORESETs corresponding to the first CORESET group and configured for CBG-based transmission, where the first HARQ message may be generated based on the first sub-codebook and the second sub-codebook, generating a third sub-codebook for the second dynamic HARQ codebook based on DCI messages in CCs that may be configured with CORESETs corresponding to the second CORESET group, and generating a fourth sub-codebook for the second dynamic HARQ codebook based on DCI messages in CCs that may be configured with CORESETs corresponding to the second CORESET group and configured for CBG-based transmission, where the second HARQ message may be generated based on the third sub-codebook and the fourth sub-codebook.

In some examples of the method, apparatuses, and non-transitory computer-readable medium described herein, a first number of HARQ bits for each cDAI position in the second sub-codebook may be based on a greatest number of configured CBGs for the CCs that may be configured with CORESETs corresponding to the first CORESET group and configured for CBG-based transmission, and a second number of HARQ bits for each cDAI position in the fourth sub-codebook may be based on a greatest number of configured CBGs for the CCs that may be configured with CORESETs corresponding to the second CORESET group and configured for CBG-based transmission.

In some implementations, the method, apparatuses, and non-transitory computer-readable medium described herein may further include operations, configurations, features, means, or instructions for tracking a TB-based cDAI for the first CORESET group corresponding to the first sub-codebook, a TB-based tDAI for the first CORESET group corresponding to the first sub-codebook, a CBG-based cDAI for the first CORESET group corresponding to the second sub-codebook, a CBG-based tDAI for the first CORESET group corresponding to the second sub-codebook, a TB-based cDAI for the second CORESET group corresponding to the third sub-codebook, a TB-based tDAI for the second CORESET group corresponding to the third sub-codebook, a CBG-based cDAI for the second CORESET group corresponding to the fourth sub-codebook, and a CBG-based tDAI for the second CORESET group corresponding to the fourth sub-codebook.

In some examples of the method, apparatuses, and non-transitory computer-readable medium described herein, the configuration indicates joint HARQ feedback, the one or more feedback messages include a HARQ message corresponding to both the first CORESET group and the second CORESET group, and the dynamic feedback codebook includes a dynamic HARQ codebook corresponding to both the first CORESET group and the second CORESET group.

In some implementations, the method, apparatuses, and non-transitory computer-readable medium described herein may further include operations, configurations, features, means, or instructions for generating the first sub-codebook for the dynamic HARQ codebook based on DCI messages in CCs that may be configured with CORESETs corresponding to the first CORESET group, generating the second sub-codebook for the dynamic HARQ codebook based on DCI messages in CCs that may be configured with CORESETs corresponding to the first CORESET group and configured for CBG-based transmission, generating a third sub-codebook for the dynamic HARQ codebook based on DCI messages in CCs that may be configured with CORESETs corresponding to the second CORESET group, and generating a fourth sub-codebook for the dynamic HARQ codebook based on DCI messages in CCs that may be configured with CORESETs corresponding to the second CORESET group and configured for CBG-based transmission, where the HARQ message may be generated based on the first sub-codebook, the second sub-codebook, the third sub-codebook, and the fourth sub-codebook and may be transmitted in an uplink resource.

In some implementations, the method, apparatuses, and non-transitory computer-readable medium described herein may further include operations, configurations, features, means, or instructions for tracking a TB-based cDAI for the first CORESET group corresponding to the first sub-codebook, a TB-based tDAI for the first CORESET group corresponding to the first sub-codebook, a CBG-based cDAI for the first CORESET group corresponding to the second sub-codebook, a CBG-based tDAI for the CORESET group corresponding to the second sub-codebook, a TB-based cDAI for the second CORESET group corresponding to the third sub-codebook, a TB-based tDAI for the second CORESET group corresponding to the third sub-codebook, a CBG-based cDAI for the second CORESET group corresponding to the fourth sub-codebook, and a CBG-based tDAI for the second CORESET group corresponding to the fourth sub-codebook.

In some examples of the method, apparatuses, and non-transitory computer-readable medium described herein, the configuration indicates a first transmission and reception point (TRP) using a first higher layer index corresponding to the first CORESET group including the first CORESET and indicates a second TRP using a second higher layer index corresponding to the second CORESET group including the second CORESET.

In some examples of the method, apparatuses, and non-transitory computer-readable medium described herein, each CORESET group of the set of CORESET groups corresponds to a TRP of a set of TRPs.

In some implementations, identifying that one or more of the set of downlink CCs may be configured for CBG-based transmission, as implemented in the method, apparatuses, and non-transitory computer-readable medium described herein, can include operations, configurations, features, means, or instructions for identifying that each respective CC may be configured with a common CBG configuration for all CORESETs associated with the respective CC.

In some examples of the method, apparatuses, and non-transitory computer-readable medium described herein, the common CBG configuration includes a physical downlink shared channel (PDSCH) CBG transmission indicator for each respective CC.

In some implementations, identifying that one or more of the set of downlink CCs may be configured for CBG-based transmission, as implemented in the method, apparatuses, and non-transitory computer-readable medium described herein, can include operations, configurations, features, means, or instructions for identifying that each respective CORESET group may be configured with a CBG configuration for all CORESETs associated with the respective CORESET groups of each respective CC.

In some examples of the method, apparatuses, and non-transitory computer-readable medium described herein, the CBG configuration includes a PDSCH CBG transmission indicator for the respective CORESET groups associated with each respective CC.

In some examples of the method, apparatuses, and non-transitory computer-readable medium described herein, the one or more DCI messages may be received as a first DCI message corresponding to a first CORESET group and as a second DCI message corresponding to a second CORESET group, the first DCI message being a different size than the second DCI message based on the first CORESET group corresponding to a first CBG transmission information (CBGTI) field size and the second CORESET group to a second CBGTI field size different from the first CBGTI field size.

In some implementations, receiving the configuration, as implemented in the method, apparatuses, and non-transitory computer-readable medium described herein, can include operations, configurations, features, means, or instructions for receiving a radio resource control (RRC) message indicating the configuration.

Another innovative aspect of the subject matter described in this disclosure can be implemented in a method for wireless communications. The method may include transmitting, for a UE, a configuration for a downlink control channel monitoring occasion including a set of CORESETs, each CORESET being associated with one of a set of CORESET groups and one of a set of downlink CCs, where one or more of the set of downlink CCs is configured for CBG-based transmission, transmitting one or more DCI messages in one or more of the set of CORESETs, and receiving, from the UE, one or more feedback messages relating to one or more downlink data messages scheduled by the one or more DCI messages, the one or more feedback messages being in accordance with a set of sub-codebooks for a dynamic feedback codebook, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups, and based on an association between the set of CORESETs, the set of CORESET groups, the one or more of the set of downlink CCs configured for CBG-based transmission, or a combination thereof.

Another innovative aspect of the subject matter described in this disclosure can be implemented in an apparatus for wireless communications. The apparatus may include a first interface, a second interface, and a processing system. The first interface may be configured to output, for a UE, a configuration for a downlink control channel monitoring occasion including a set of CORESETs, each CORESET being associated with one of a set of CORESET groups and one of a set of downlink CCs, where one or more of the set of downlink CCs is configured for CBG-based transmission and output one or more DCI messages in one or more of the set of CORESETs. The second interface may be configured to obtain, from the UE, one or more feedback messages relating to one or more downlink data messages scheduled by the one or more DCI messages, the one or more feedback messages being in accordance with a set of sub-codebooks for a dynamic feedback codebook, the set of sub-codebooks including at least a first sub-codebook associated with TB-based transmission for the one or more CORESET groups of the set of CORESET groups and a second sub-codebook associated with CBG-based transmission for the one or more CORESET groups of the set of CORESET groups, and based on an association between the set of CORESETs, the set of CORESET groups, the one or more of the set of downlink CCs configured for CBG-based transmission, or a combination thereof.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to transmit, for a UE, a configuration for a downlink control channel monitoring occasion including a set of CORESETs, each CORESET being associated with one of a set of CORESET groups and one of a set of downlink CCs, where one or more of the set of downlink CCs is configured for CBG-based transmission, transmit one or more DCI messages in one or more of the set of CORESETs, and receive, from the UE, one or more feedback messages relating to one or more downlink data messages scheduled by the one or more DCI messages, the one or more feedback messages being in accordance with a set of sub-codebooks for a dynamic feedback codebook, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups, and based on an association between the set of CORESETs, the set of CORESET groups, the one or more of the set of downlink CCs configured for CBG-based transmission, or a combination thereof.

Another innovative aspect of the subject matter described in this disclosure can be implemented in another apparatus for wireless communications. The apparatus may include means for transmitting, for a UE, a configuration for a downlink control channel monitoring occasion including a set of CORESETs, each CORESET being associated with one of a set of CORESET groups and one of a set of downlink CCs, where one or more of the set of downlink CCs is configured for CBG-based transmission, transmitting one or more DCI messages in one or more of the set of CORESETs, and receiving, from the UE, one or more feedback messages relating to one or more downlink data messages scheduled by the one or more DCI messages, the one or more feedback messages being in accordance with a set of sub-codebooks for a dynamic feedback codebook, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups, and based on an association between the set of CORESETs, the set of CORESET groups, the one or more of the set of downlink CCs configured for CBG-based transmission, or a combination thereof.

Another innovative aspect of the subject matter described in this disclosure can be implemented in a non-transitory computer-readable medium storing code for wireless communications. The code may include instructions executable by a processor to transmit, for a UE, a configuration for a downlink control channel monitoring occasion including a set of CORESETs, each CORESET being associated with one of a set of CORESET groups and one of a set of downlink CCs, where one or more of the set of downlink CCs is configured for CBG-based transmission, transmit one or more DCI messages in one or more of the set of CORESETs, and receive, from the UE, one or more feedback messages relating to one or more downlink data messages scheduled by the one or more DCI messages, the one or more feedback messages being in accordance with a set of sub-codebooks for a dynamic feedback codebook, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups, and based on an association between the set of CORESETs, the set of CORESET groups, the one or more of the set of downlink CCs configured for CBG-based transmission, or a combination thereof.

In some implementations, transmitting the one or more DCI messages in the one or more of the CORESETs, as implemented in the method, apparatuses, and non-transitory computer-readable medium described herein, can include operations, configurations, features, means, or instructions for transmitting, to the UE in a first CORESET of the downlink control channel monitoring occasion corresponding to a first CORESET group, a first DCI message scheduling a first downlink data message, and transmitting, to the UE in a second CORESET of the downlink control channel monitoring occasion corresponding to a second CORESET group, a second DCI message scheduling a second downlink data message.

In some implementations, the method, apparatuses, and non-transitory computer-readable medium described herein may further include operations, configurations, features, means, or instructions for configuring the UE for joint HARQ feedback.

In some examples of the method, apparatuses, and non-transitory computer-readable medium described herein, the dynamic feedback codebook includes the first sub-codebook indicating first HARQ acknowledgement information for DCI messages in CCs that may be configured with CORESETs corresponding to the first CORESET group, CORESETs corresponding to the second CORESET group, or both and the second sub-codebook indicating second HARQ acknowledgement information for DCI messages in CCs that may be configured with CORESETs corresponding to the first CORESET group, CORESETs corresponding to the second CORESET group, or both and configured for CBG-based transmission.

In some examples of the method, apparatuses, and non-transitory computer-readable medium described herein, a number of HARQ bits for each cDAI position in the second sub-codebook may be based on a greatest number of configured CBGs for the CCs that may be configured with CORESETs corresponding to the first CORESET group, CORESETs corresponding to the second CORESET group, or both and configured for CBG-based transmission for the set of CORESET groups.

In some implementations, the method, apparatuses, and non-transitory computer-readable medium described herein may further include operations, configurations, features, means, or instructions for configuring the UE for separate DAI tracking for the first CORESET group and for the second CORESET group.

In some implementations, the method, apparatuses, and non-transitory computer-readable medium described herein may further include operations, configurations, features, means, or instructions for configuring the UE for separate HARQ feedback, where the one or more feedback messages include a first HARQ message corresponding to the first CORESET group and the dynamic feedback codebook includes a first dynamic HARQ codebook corresponding to the first CORESET group, and receiving, from the UE in a second uplink resource, a second HARQ message based on a second dynamic HARQ codebook, where the first HARQ message may be received in a first uplink resource different from the second uplink resource.

In some examples of the method, apparatuses, and non-transitory computer-readable medium described herein, the first dynamic HARQ codebook includes the first sub-codebook indicating first HARQ acknowledgement information for DCI messages in CCs that may be configured with CORESETs corresponding to the first CORESET group and the second sub-codebook indicating second HARQ acknowledgement information for DCI messages in CCs that may be configured with CORESETs corresponding to the first CORESET group and configured for CBG-based transmission, and the second dynamic HARQ codebook includes a third sub-codebook indicating third HARQ acknowledgement information for DCI messages in CCs that may be configured with CORESETs corresponding to the second CORESET group and a fourth sub-codebook indicating fourth HARQ acknowledgement information for DCI messages in CCs that may be configured with CORESETs corresponding to the second CORESET group and configured for CBG-based transmission.

In some examples of the method, apparatuses, and non-transitory computer-readable medium described herein, a first number of HARQ bits for each cDAI position in the second sub-codebook may be based on a greatest number of configured CBGs for the CCs that may be configured with CORESETs corresponding to the first CORESET group and configured for CBG-based transmission, and a second number of HARQ bits for each cDAI position in the fourth sub-codebook may be based on a greatest number of configured CBGs for the CCs that may be configured with CORESETs corresponding to the second CORESET group and configured for CBG-based transmission.

In some implementations, the method, apparatuses, and non-transitory computer-readable medium described herein may further include operations, configurations, features, means, or instructions for configuring the UE for joint HARQ feedback, where the one or more feedback messages include a HARQ message corresponding to both the first CORESET group and the second CORESET group, and the dynamic feedback codebook includes a dynamic HARQ codebook corresponding to both the first CORESET group and the second CORESET group.

In some examples of the method, apparatuses, and non-transitory computer-readable medium described herein, the dynamic HARQ codebook includes the first sub-codebook indicating first HARQ acknowledgement information for DCI messages in CCs that may be configured with CORESETS corresponding to the first CORESET group, the second sub-codebook indicating second HARQ acknowledgement information for DCI messages in CCs that may be configured with CORESETs corresponding to the first CORESET group and configured for CBG-based transmission, a third sub-codebook indicating third HARQ acknowledgement information for DCI messages in CCs that may be configured with CORESETs corresponding to the CORESETs, and a fourth sub-codebook indicating fourth HARQ acknowledgement information for DCI messages in CCs that may be configured with CORESETs corresponding to the second CORESET group and configured for CBG-based transmission.

In some examples of the method, apparatuses, and non-transitory computer-readable medium described herein, the configuration indicates the first TRP using a first higher layer index corresponding to a first CORESET group including the first CORESET and indicates the second TRP using a second higher layer index corresponding to a second CORESET group including the second CORESET.

In some examples of the method, apparatuses, and non-transitory computer-readable medium described herein, each CORESET group of the set of CORESET groups corresponds to a TRP of a set of TRPs.

In some implementations, the method, apparatuses, and non-transitory computer-readable medium described herein may further include operations, configurations, features, means, or instructions for configuring each respective CC with a common CBG configuration for all CORESETs associated with the respective CC.

In some examples of the method, apparatuses, and non-transitory computer-readable medium described herein, the common CBG configuration includes a PDSCH CBG transmission indicator for each respective CC.

In some implementations, the method, apparatuses, and non-transitory computer-readable medium described herein may further include operations, configurations, features, means, or instructions for configuring each respective CORESET group with a CBG configuration for all CORESETs associated with respective CORESET groups of each respective CC.

In some examples of the method, apparatuses, and non-transitory computer-readable medium described herein, the CBG configuration includes a PDSCH CBG transmission indicator for the respective CORESET group associated with each respective CC.

In some examples of the method, apparatuses, and non-transitory computer-readable medium described herein, the one or more DCI messages may be transmitted as a first DCI message corresponding to a first CORESET group and as a second DCI message corresponding to a second CORESET group, the first DCI message being a different size than the second DCI message based on the first CORESET group corresponding to a first CBGTI field size and the second CORESET group corresponding to a second CBGTI field size different from the first CBGTI field size.

In some implementations, transmitting the configuration, as implemented in the method, apparatuses, and non-transitory computer-readable medium described herein, can include operations, configurations, features, means, or instructions for transmitting an RRC message indicating the configuration.

Another innovative aspect of the subject matter described in this disclosure can be implemented in a method for wireless communications at a UE. The method may include receiving a configuration for a downlink control channel monitoring occasion including a set of CORESETs, each CORESET being associated with one of a set of CORESET groups and one of a set of downlink CCs, and the configuration indicating joint HARQ feedback for the set of CORESET groups, receiving, in a first CORESET of the downlink control channel monitoring occasion corresponding to a first CORESET group, a first DCI message scheduling a first downlink data message, receiving, in a second CORESET of the downlink control channel monitoring occasion corresponding to a second CORESET group, a second DCI message scheduling a second downlink data message, identifying that one or more of the set of downlink CCs is configured for CBG-based transmission, generating, according to a set of sub-codebooks for a dynamic feedback codebook, a joint feedback message for the first downlink data message corresponding to the first CORESET group and the second downlink data message corresponding to the second CORESET group based on the configuration indicating joint HARQ feedback, the set of sub-codebooks including a first sub-codebook associated with TB-based transmission for the first CORESET group and the second CORESET group and a second sub-codebook associated with CBG-based transmission for the first CORESET group and the second CORESET group based on the one or more of the set of downlink CCs configured for CBG-based transmission, and transmitting the joint feedback message.

Another innovative aspect of the subject matter described in this disclosure can be implemented in an apparatus for wireless communications. The apparatus may include a first interface, a second interface, and a processing system. The first interface may be configured to obtain a configuration for a downlink control channel monitoring occasion including a set of CORESETs, each CORESET being associated with one of a set of CORESET groups and one of a set of downlink CCs, and the configuration indicating joint HARQ feedback for the set of CORESET groups, obtain, in a first CORESET of the downlink control channel monitoring occasion corresponding to a first CORESET group, a first DCI message scheduling a first downlink data message, and obtain, in a second CORESET of the downlink control channel monitoring occasion corresponding to a second CORESET group, a second DCI message scheduling a second downlink data message. The processing system may be configured to identify that one or more of the set of downlink CCs is configured for CBG-based transmission and generate, according to a set of sub-codebooks for a dynamic feedback codebook, a joint feedback message for the first downlink data message corresponding to the first CORESET group and the second downlink data message corresponding to the second CORESET group based on the configuration indicating joint HARQ feedback, the set of sub-codebooks including a first sub-codebook associated with TB-based transmission for the first CORESET group and the second CORESET group and a second sub-codebook associated with CBG-based transmission for the first CORESET group and the second CORESET group based on the one or more of the set of downlink CCs configured for CBG-based transmission. The second interface may be configured to output the joint feedback message.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive a configuration for a downlink control channel monitoring occasion including a set of CORESETs, each CORESET being associated with one of a set of CORESET groups and one of a set of downlink CCs, and the configuration indicating joint HARQ feedback for the set of CORESET groups, receive, in a first CORESET of the downlink control channel monitoring occasion corresponding to a first CORESET group, a first DCI message scheduling a first downlink data message, receive, in a second CORESET of the downlink control channel monitoring occasion corresponding to a second CORESET group, a second DCI message scheduling a second downlink data message, identify that one or more of the set of downlink CCs is configured for CBG-based transmission, generate, according to a set of sub-codebooks for a dynamic feedback codebook, a joint feedback message for the first downlink data message corresponding to the first CORESET group and the second downlink data message corresponding to the second CORESET group based on the configuration indicating joint HARQ feedback, the set of sub-codebooks including a first sub-codebook associated with TB-based transmission for the first CORESET group and the second CORESET group and a second sub-codebook associated with CBG-based transmission for the first CORESET group and the second CORESET group based on the one or more of the set of downlink CCs configured for CBG-based transmission, and transmit the joint feedback message.

Another innovative aspect of the subject matter described in this disclosure can be implemented in another apparatus for wireless communications at a UE. The apparatus may include means for receiving a configuration for a downlink control channel monitoring occasion including a set of CORESETs, each CORESET being associated with one of a set of CORESET groups and one of a set of downlink CCs, and the configuration indicating joint HARQ feedback for the set of CORESET groups, receiving, in a first CORESET of the downlink control channel monitoring occasion corresponding to a first CORESET group, a first DCI message scheduling a first downlink data message, receiving, in a second CORESET of the downlink control channel monitoring occasion corresponding to a second CORESET group, a second DCI message scheduling a second downlink data message, identifying that one or more of the set of downlink CCs is configured for CBG-based transmission, generating, according to a set of sub-codebooks for a dynamic feedback codebook, a joint feedback message for the first downlink data message corresponding to the first CORESET group and the second downlink data message corresponding to the second CORESET group based on the configuration indicating joint HARQ feedback, the set of sub-codebooks including a first sub-codebook associated with TB-based transmission for the first CORESET group and the second CORESET group and a second sub-codebook associated with CBG-based transmission for the first CORESET group and the second CORESET group based on the one or more of the set of downlink CCs configured for CBG-based transmission, and transmitting the joint feedback message.

Another innovative aspect of the subject matter described in this disclosure can be implemented in a non-transitory computer-readable medium storing code for wireless communications at a UE. The code may include instructions executable by a processor to receive a configuration for a downlink control channel monitoring occasion including a set of CORESETs, each CORESET being associated with one of a set of CORESET groups and one of a set of downlink CCs, and the configuration indicating joint HARQ feedback for the set of CORESET groups, receive, in a first CORESET of the downlink control channel monitoring occasion corresponding to a first CORESET group, a first DCI message scheduling a first downlink data message, receive, in a second CORESET of the downlink control channel monitoring occasion corresponding to a second CORESET group, a second DCI message scheduling a second downlink data message, identify that one or more of the set of downlink CCs is configured for CBG-based transmission, generate, according to a set of sub-codebooks for a dynamic feedback codebook, a joint feedback message for the first downlink data message corresponding to the first CORESET group and the second downlink data message corresponding to the second CORESET group based on the configuration indicating joint HARQ feedback, the set of sub-codebooks including a first sub-codebook associated with TB-based transmission for the first CORESET group and the second CORESET group and a second sub-codebook associated with CBG-based transmission for the first CORESET group and the second CORESET group based on the one or more of the set of downlink CCs configured for CBG-based transmission, and transmit the joint feedback message.

In some implementations, the method, apparatuses, and non-transitory computer-readable medium described herein may further include operations, configurations, features, means, or instructions for determining, based on the configuration, a first set of downlink cells of a set of multiple downlink cells in which CBG-based transmission is not configured, determining, based on the configuration, a second set of downlink cells of the set of multiple downlink cells in which CBG-based transmission is configured, determining the first sub-codebook based on the set of multiple downlink cells, and determining the second sub-codebook based on the second set of downlink cells in which CBG-based transmission is configured.

In some implementations, the method, apparatuses, and non-transitory computer-readable medium described herein may further include operations, configurations, features, means, or instructions for counting DAIs jointly for the first CORESET group and the second CORESET group based on the configuration indicating joint HARQ feedback.

One innovative aspect of the subject matter described in this disclosure can be implemented in a method for wireless communications at a UE. The method may include receiving a configuration for a downlink control channel monitoring occasion including a set of CORESETs corresponding to a set of CORESET groups, where the configuration indicates to implement a semi-static feedback codebook, receiving, in a first CORESET of the downlink control channel monitoring occasion corresponding to a first CORESET group, in a first semi-persistent scheduling (SPS) occasion corresponding to the first CORESET group, or in both, a downlink message associated with a feedback procedure, generating, for the feedback procedure, a feedback message including a one-bit acknowledgement indication for the first CORESET group based on the downlink message and the configuration for the downlink control channel monitoring occasion including the set of CORESETs corresponding to the set of CORESET groups, and transmitting the feedback message including the one-bit acknowledgement indication.

Another innovative aspect of the subject matter described in this disclosure can be implemented in an apparatus for wireless communications. The apparatus may include a first interface, a second interface, and a processing system. The first interface may be configured to obtain a configuration for a downlink control channel monitoring occasion including a set of CORESETs corresponding to a set of CORESET groups, where the configuration indicates to implement a semi-static feedback codebook and obtain, in a first CORESET of the downlink control channel monitoring occasion corresponding to a first CORESET group, in a first SPS occasion corresponding to the first CORESET group, or in both, a downlink message associated with a feedback procedure. The processing system may be configured to generate, for the feedback procedure, a feedback message including a one-bit acknowledgement indication for the first CORESET group based on the downlink message and the configuration for the downlink control channel monitoring occasion including the set of CORESETs corresponding to the set of CORESET groups. The second interface may be configured to output the feedback message including the one-bit acknowledgement indication.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive a configuration for a downlink control channel monitoring occasion including a set of CORESETs corresponding to a set of CORESET groups, where the configuration indicates to implement a semi-static feedback codebook, receive, in a first CORESET of the downlink control channel monitoring occasion corresponding to a first CORESET group, in a first SPS occasion corresponding to the first CORESET group, or in both, a downlink message associated with a feedback procedure, generate, for the feedback procedure, a feedback message including a one-bit acknowledgement indication for the first CORESET group based on the downlink message and the configuration for the downlink control channel monitoring occasion including the set of CORESETs corresponding to the set of CORESET groups, and transmit the feedback message including the one-bit acknowledgement indication.

Another innovative aspect of the subject matter described in this disclosure can be implemented in another apparatus for wireless communications at a UE. The apparatus may include means for receiving a configuration for a downlink control channel monitoring occasion including a set of CORESETs corresponding to a set of CORESET groups, where the configuration indicates to implement a semi-static feedback codebook, receiving, in a first CORESET of the downlink control channel monitoring occasion corresponding to a first CORESET group, in a first SPS occasion corresponding to the first CORESET group, or in both, a downlink message associated with a feedback procedure, generating, for the feedback procedure, a feedback message including a one-bit acknowledgement indication for the first CORESET group based on the downlink message and the configuration for the downlink control channel monitoring occasion including the set of CORESETs corresponding to the set of CORESET groups, and transmitting the feedback message including the one-bit acknowledgement indication.

Another innovative aspect of the subject matter described in this disclosure can be implemented in a non-transitory computer-readable medium storing code for wireless communications at a UE. The code may include instructions executable by a processor to receive a configuration for a downlink control channel monitoring occasion including a set of CORESETs corresponding to a set of CORESET groups, where the configuration indicates to implement a semi-static feedback codebook, receive, in a first CORESET of the downlink control channel monitoring occasion corresponding to a first CORESET group, in a first SPS occasion corresponding to the first CORESET group, or in both, a downlink message associated with a feedback procedure, generate, for the feedback procedure, a feedback message including a one-bit acknowledgement indication for the first CORESET group based on the downlink message and the configuration for the downlink control channel monitoring occasion including the set of CORESETs corresponding to the set of CORESET groups, and transmit the feedback message including the one-bit acknowledgement indication.

In some examples of the method, apparatuses, and non-transitory computer-readable medium described herein, the downlink message includes a first downlink message. In some implementations, the method, apparatuses, and non-transitory computer-readable medium described herein may further include operations, configurations, features, means, or instructions for receiving, in a second CORESET group, in a second SPS occasion corresponding to the second CORESET group, or in both, a second downlink message associated with the feedback procedure.

In some implementations, the method, apparatuses, and non-transitory computer-readable medium described herein may further include operations, configurations, features, means, or instructions for determining to transmit separate HARQ feedback for the first downlink message corresponding to the first CORESET group and the second downlink message corresponding to the second CORESET group based on the configuration.

In some examples of the method, apparatuses, and non-transitory computer-readable medium described herein, the feedback message includes a first HARQ message corresponding to the first CORESET group. In some implementations, the method, apparatuses, and non-transitory computer-readable medium described herein may further include operations, configurations, features, means, or instructions for applying a first skipping rule for the first CORESET group, where the first HARQ message includes the one-bit acknowledgement indication for the first CORESET group based on the first skipping rule, determining whether to apply a second skipping rule for the second CORESET group, generating a second HARQ message based on the determining whether to apply the second skipping rule for the second CORESET group, and transmitting the second HARQ message in a second uplink resource, where the first HARQ message is output in a first uplink resource different from the second uplink resource.

In some implementations, the method, apparatuses, and non-transitory computer-readable medium described herein may further include operations, configurations, features, means, or instructions for determining to transmit joint HARQ feedback for the first downlink message corresponding to the first CORESET group and the second downlink message corresponding to the second CORESET group based on the configuration.

In some implementations, the method, apparatuses, and non-transitory computer-readable medium described herein may further include operations, configurations, features, means, or instructions for applying a first skipping rule for the first CORESET group, where the feedback message includes the one-bit acknowledgement indication for the first CORESET group based on the first skipping rule and determining whether to apply a second skipping rule for the second CORESET group, where the feedback message is generated based on the determining whether to apply the second skipping rule for the second CORESET group.

In some implementations, the method, apparatuses, and non-transitory computer-readable medium described herein may further include operations, configurations, features, means, or instructions for applying the second skipping rule for the second CORESET group based on the second downlink message, where the feedback message includes a second one-bit acknowledgement indication for the second CORESET group based on the second skipping rule.

In some implementations, the method, apparatuses, and non-transitory computer-readable medium described herein may further include operations, configurations, features, means, or instructions for refraining from applying the second skipping rule for the second CORESET group based on the second downlink message, where the feedback message is based on the semi-static feedback codebook.

In some implementations, the method, apparatuses, and non-transitory computer-readable medium described herein may further include operations, configurations, features, means, or instructions for determining to transmit joint HARQ feedback for the set of CORESET groups.

In some implementations, the method, apparatuses, and non-transitory computer-readable medium described herein may further include operations, configurations, features, means, or instructions for applying a skipping rule for the set of CORESET groups, where the one-bit acknowledgement indication is for the set of CORESET groups based on the skipping rule In some implementations, the method, apparatuses, and non-transitory computer-readable medium described herein may further include operations, configurations, features, means, or instructions for applying a first skipping rule for the first CORESET group, where the feedback message includes the one-bit acknowledgement indication for the first CORESET group based on the first skipping rule and applying a second skipping rule for a second CORESET group based on not receiving a second downlink message associated with the feedback procedure in a second CORESET of the downlink control channel monitoring occasion corresponding to the second CORESET group or in a second SPS occasion corresponding to the second CORESET group, where the feedback message includes a second one-bit acknowledgement indication for the second CORESET group based on the second skipping rule.

In some implementations, the method, apparatuses, and non-transitory computer-readable medium described herein may further include operations, configurations, features, means, or instructions for apply a skipping rule based on the downlink message including a DCI message indicating an SPS release, a downlink data message scheduled using a fallback DCI message with a counter downlink assignment index value of one, an SPS downlink data message, or a combination thereof, where the feedback message includes the one-bit acknowledgement indication for the first CORESET group based on the skipping rule.

In some examples of the method, apparatuses, and non-transitory computer-readable medium described herein, the configuration indicates a first TRP using a first higher layer index corresponding to the first CORESET group including the first CORESET and indicates a second TRP using a second higher layer index corresponding to a second CORESET group including a second CORESET.

In some examples of the method, apparatuses, and non-transitory computer-readable medium described herein, the one-bit acknowledgement indication includes a one-bit positive acknowledgement (ACK) indication or a one-bit negative acknowledgement (NACK) indication.

In some implementations, transmitting the configuration, as implemented in the method, apparatuses, and non-transitory computer-readable medium described herein, can include operations, configurations, features, means, or instructions for receiving an RRC message indicating the configuration.

Another innovative aspect of the subject matter described in this disclosure can be implemented in a method for wireless communications. The method may include transmitting, for a UE, a configuration for a downlink control channel monitoring occasion including a set of CORESETs corresponding to a set of CORESET groups, where the configuration indicates for the UE to implement a semi-static feedback codebook, transmitting, in a first CORESET of the downlink control channel monitoring occasion corresponding to a first CORESET group, in a first SPS occasion corresponding to the first CORESET group, or in both, a downlink message associated with a feedback procedure, and receiving, for the feedback procedure, a feedback message including a one-bit acknowledgement indication for the first CORESET group based on the downlink message and the configuration for the downlink control channel monitoring occasion including the set of CORESETs corresponding to the set of CORESET groups.

Another innovative aspect of the subject matter described in this disclosure can be implemented in an apparatus for wireless communications. The apparatus may include a first interface, a second interface, and a processing system. The first interface may be configured to output, for a UE, for a UE, a configuration for a downlink control channel monitoring occasion including a set of CORESETs corresponding to a set of CORESET groups, where the configuration indicates for the UE to implement a semi-static feedback codebook, and output, in a first CORESET of the downlink control channel monitoring occasion corresponding to a first CORESET group, in a first SPS occasion corresponding to the first CORESET group, or in both, a downlink message associated with a feedback procedure. The second interface may be configured to obtain, from the UE, for the feedback procedure, a feedback message including a one-bit acknowledgement indication for the first CORESET group based on the downlink message and the configuration for the downlink control channel monitoring occasion including the set of CORESETs corresponding to the set of CORESET groups.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to transmit, for a UE, a configuration for a downlink control channel monitoring occasion including a set of CORESETs corresponding to a set of CORESET groups, where the configuration indicates for the UE to implement a semi-static feedback codebook, transmit, in a first CORESET of the downlink control channel monitoring occasion corresponding to a first CORESET group, in a first SPS occasion corresponding to the first CORESET group, or in both, a downlink message associated with a feedback procedure, and receive, for the feedback procedure, a feedback message including a one-bit acknowledgement indication for the first CORESET group based on the downlink message and the configuration for the downlink control channel monitoring occasion including the set of CORESETs corresponding to the set of CORESET groups.

Another innovative aspect of the subject matter described in this disclosure can be implemented in another apparatus for wireless communications. The apparatus may include means for transmitting, for a UE, a configuration for a downlink control channel monitoring occasion including a set of CORESETs corresponding to a set of CORESET groups, where the configuration indicates for the UE to implement a semi-static feedback codebook, transmitting, in a first CORESET of the downlink control channel monitoring occasion corresponding to a first CORESET group, in a first SPS occasion corresponding to the first CORESET group, or in both, a downlink message associated with a feedback procedure, and receiving, for the feedback procedure, a feedback message including a one-bit acknowledgement indication for the first CORESET group based on the downlink message and the configuration for the downlink control channel monitoring occasion including the set of CORESETs corresponding to the set of CORESET groups.

Another innovative aspect of the subject matter described in this disclosure can be implemented in a non-transitory computer-readable medium storing code for wireless communications. The code may include instructions executable by a processor to transmit, for a UE, a configuration for a downlink control channel monitoring occasion including a set of CORESETs corresponding to a set of CORESET groups, where the configuration indicates for the UE to implement a semi-static feedback codebook, transmit, in a first CORESET of the downlink control channel monitoring occasion corresponding to a first CORESET group, in a first SPS occasion corresponding to the first CORESET group, or in both, a downlink message associated with a feedback procedure, and receive, for the feedback procedure, a feedback message including a one-bit acknowledgement indication for the first CORESET group based on the downlink message and the configuration for the downlink control channel monitoring occasion including the set of CORESETs corresponding to the set of CORESET groups.

In some examples of the method, apparatuses, and non-transitory computer-readable medium described herein, the downlink message may include a first downlink message. In some implementations, the method, apparatuses, and non-transitory computer-readable medium described herein may further include operations, configurations, features, means, or instructions for transmitting, in a second CORESET group, in a second SPS occasion corresponding to the second CORESET group, or in both, a second downlink message associated with the feedback procedure.

In some implementations, the method, apparatuses, and non-transitory computer-readable medium described herein may further include operations, configurations, features, means, or instructions for configuring the UE for separate HARQ feedback.

In some examples of the method, apparatuses, and non-transitory computer-readable medium described herein, the feedback message may include a first HARQ message corresponding to the first CORESET group. In some implementations, the method, apparatuses, and non-transitory computer-readable medium described herein may further include operations, configurations, features, means, or instructions for receiving a second HARQ message in a second uplink resource, where the second HARQ message is based on the semi-static feedback codebook for the second CORESET group and the first HARQ message is received in a first uplink resource different from the second uplink resource.

In some implementations, the method, apparatuses, and non-transitory computer-readable medium described herein may further include operations, configurations, features, means, or instructions for configuring the UE for joint HARQ feedback.

In some examples of the method, apparatuses, and non-transitory computer-readable medium described herein, the feedback message is further based on the semi-static feedback codebook for the second CORESET group.

In some examples of the method, apparatuses, and non-transitory computer-readable medium described herein, the feedback message includes the one-bit acknowledgement indication for the set of CORESET groups.

In some examples of the method, apparatuses, and non-transitory computer-readable medium described herein, the feedback message further includes a second one-bit acknowledgement indication for a second CORESET group based on not transmitting, for the UE, a second downlink message associated with the feedback procedure in a second CORESET of the downlink control channel monitoring occasion corresponding to the second CORESET group or in a second SPS occasion corresponding to the second CORESET group.

In some examples of the method, apparatuses, and non-transitory computer-readable medium described herein, the feedback message includes the one-bit acknowledgement indication for the first CORESET group based on the downlink message including a DCI message indicating an SPS release, a downlink data message scheduled using a fallback DCI message with a cDAI value of one, an SPS downlink data message, or a combination thereof.

In some examples of the method, apparatuses, and non-transitory computer-readable medium described herein, the configuration indicates a first TRP using a first higher layer index corresponding to the first CORESET group including the first CORESET and indicates a second TRP using a second higher layer index corresponding to a second CORESET group including a second CORESET.

In some examples of the method, apparatuses, and non-transitory computer-readable medium described herein, the one-bit acknowledgement indication includes a one-bit ACK indication or a one-bit NACK indication In some implementations, transmitting the configuration, as implemented in the method, apparatuses, and non-transitory computer-readable medium described herein, can include operations, configurations, features, means, or instructions for transmitting an RRC message indicating the configuration.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
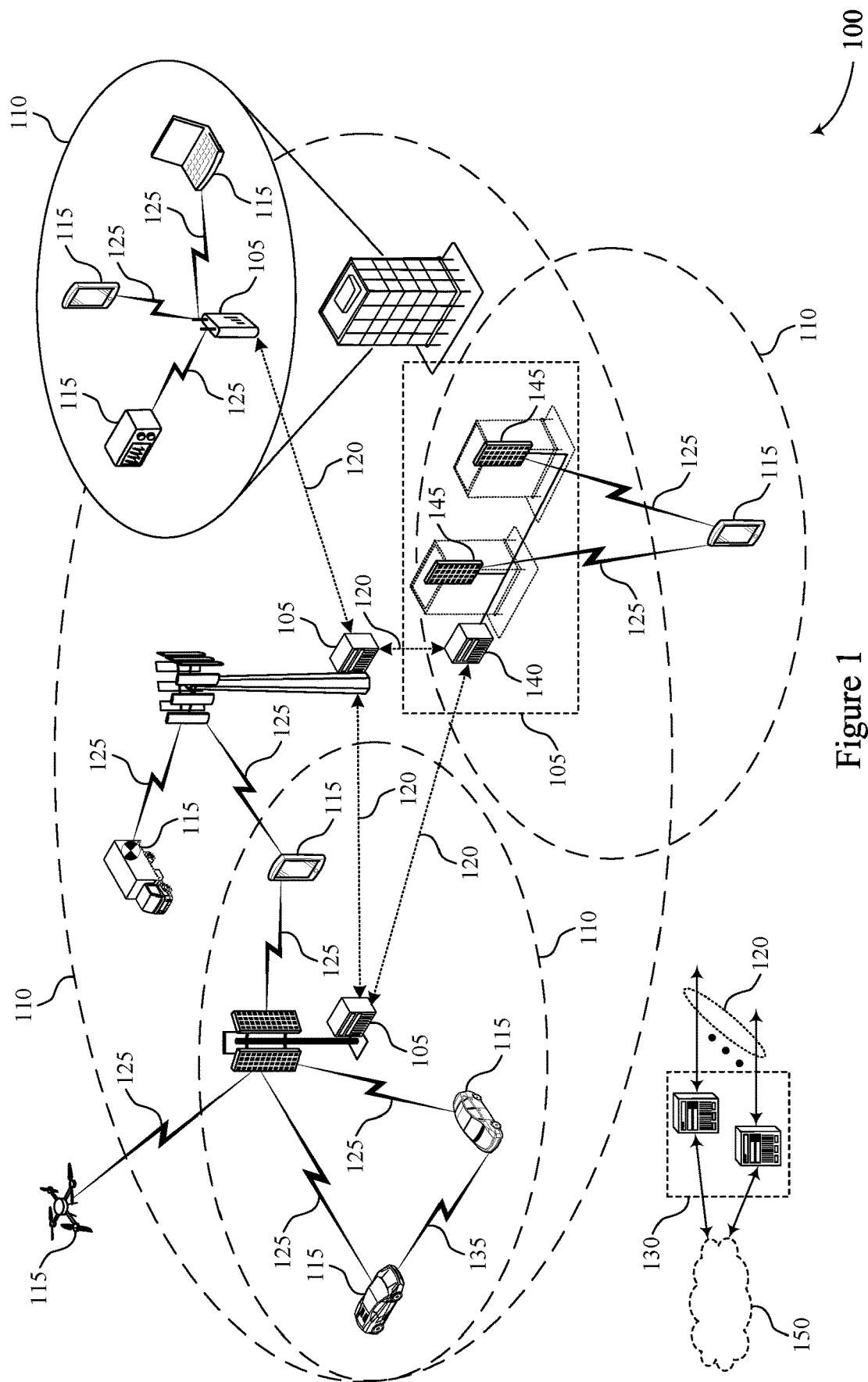
FIGS. 1 and 2 illustrate examples of wireless communications systems that support multiple downlink control information (DCI) message handling for multiple control resource set (CORESET) groups.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a base station may configure a user equipment (UE) for multiple downlink control information (DCI) messages over multiple control resource sets (CORESET) groups. The different CORESET groups may correspond to different transmission and reception points (TRPs). The base station may additionally configure the UE with procedures for providing feedback for downlink transmissions. For example, the base station may configure the UE to provide feedback information (for example, hybrid automatic repeat request (HARQ) feedback) for different TRPs (or CORESET groups) as joint feedback in a same uplink resource or as separate feedback in different uplink resources. Additionally, the base station may configure the UE with a codebook to use for generating one or more feedback messages, such as a dynamic HARQ codebook or a semi-static HARQ codebook.

In some implementations, the base station may configure the UE with multi-DCI-based multi-TRP in at least one downlink component carrier (CC) and code block group (CBG)-based transmission in at least one downlink CC. The base station may configure a same CBG configuration for any TRPs or CORESET groups in the same downlink CC or may configure TRP-specific CBG configurations within the downlink CCs. If utilizing a dynamic HARQ codebook for feedback, the UE may perform separate or joint tracking of downlink assignment indexes (DAIs) for the different TRPs. Additionally, the UE may perform separate tracking of DAIs for transport block (TB)-based and CBG-based transmissions. Based on the DAI tracking, the UE may determine multiple sub-codebooks to generate one or more dynamic HARQ codebooks for HARQ feedback. For example, for separate DAI counting for TRPs, the UE may determine a TB-based sub-codebook for a first CORESET group (for example, corresponding to a first TRP), a CBG-based sub-codebook for the first CORESET group, a TB-based sub-codebook for a second CORESET group (for example, corresponding to a second TRP), and a CBG-bases sub-codebook for the second CORESET group. For joint DAI counting for TRPs, the UE may determine a TB-based sub-codebook for the set of CORESET groups (for example, corresponding to the set of TRPs) and a CBG-based sub-codebook for the set of CORESET groups (for example, corresponding to the set of TRPs). The UE may use the sub-codebooks to generate one or more full dynamic codebooks and may use these full dynamic codebooks to generate one or more HARQ feedback messages for transmission.

Additionally, or alternatively, in some implementations, the UE may implement one or more skipping rules for semi-static codebook generation. The base station may configure the UE with multi-DCI-based multi-TRP and for semi-static HARQ feedback. If implementing separate HARQ feedback for the different TRPs, the UE may apply the skipping rules separately for the different TRPs. For example, if the UE has a single bit of HARQ feedback to transmit for a particular TRP, the UE may report the single bit for that TRP, rather than reporting a full semi-static codebook corresponding to all of the configured downlink data occasions for that TRP. If implementing joint HARQ feedback for the TRPs or CORESET group, the UE may apply the skipping rules irrespective of TRP or separately for the different TRPs. If applying the skipping rules across all of the TRPs, the UE may report a single bit of HARQ feedback if the UE has no other feedback information to transmit for any of the TRPs. If applying the skipping rules separately for each TRP or CORESET group, the UE may report a single bit of HARQ feedback for a particular TRP if the UE has no other feedback information to transmit for that particular TRP. Accordingly, in a joint semi-static codebook, the UE may include feedback information corresponding to a full semi-static codebook for one TRP while including a one-bit acknowledgement indication for another TRP (for example, in place of a full semi-static codebook).

Particular implementations of the subject matter described in this disclosure can be implemented to realize one or more of the following potential advantages. For example, by supporting CBG-based feedback for dynamic codebooks, a UE may accurately identify and report missed CBGs across multiple CORESET groups associated with different TRPs. Implementing counting rules for DAIS that separate TB-based transmissions and CBG-based transmissions while handling multiple TRPs or CORESET groups may allow the UE to correctly identify the number of feedback bits to include in one or more dynamic HARQ codebooks (for example, by identifying missing DAI values). This may, in turn, reduce the processing overhead and latency involved in a base station decoding the feedback information and determining whether to retransmit any messages (for example, TBs, CBGs, or both) to the UE.

By supporting skipping rules for semi-static codebooks, a UE may reduce the processing and signaling overhead involved in transmitting feedback to a base station. For example, the UE may apply skipping rules across the set of CORESET groups associated with multiple TRPs or separately for individual CORESET groups or TRPs. By applying the skipping rules separately for each TRP, the UE may perform granular skipping, in which the UE can transmit a full semi-static codebook for some TRPs and a single bit of HARQ feedback for other TRPs. Applying a skipping rule may involve the UE using a semi-static codebook of size one, as opposed to a full semi-static codebook size corresponding to a full set of configured downlink data occasions. The reduced codebook size may support reducing the processing overhead involved in the UE generating the feedback message, and the UE may reduce the signaling overhead on the uplink control channel when transmitting the reduced-size feedback message.

FIG. 1 illustrates an example of a wireless communications system 100 that supports multi-DCI message handling for multiple CORESET groups. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 via an S1, N2, N3, or another interface. The base stations 105 may communicate with one another over the backhaul links 120 via an X2, Xn, or another interface either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information, etc.), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples, such as in a carrier aggregation configuration, a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier, for example, of the same or a different radio access technology.

The communication links 125 shown in the wireless communications system 100 may include uplink transmissions from a UE 115 to a base station 105, or downlink transmissions from a base station 105 to a UE 115. Carriers may carry downlink or uplink communications (in an FDD mode) or may be configured to carry downlink and uplink communications (in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (such as a sub-band, a BWP, etc.) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN), for example, ranging from 0 to 1023.

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods, for example, depending on the length of the cyclic prefix prepended to each symbol period. In some wireless communications systems 100, a slot may further be divided into multiple mini-slots containing one or more symbols. Excluding the cyclic prefix, each symbol period may contain one or more sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a CORESET) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115. Additionally, different TRPs may be associated with different CORESET groups.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135, for example, using a peer-to-peer (P2P) or D2D protocol. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In some other examples, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as radio heads and ANCs) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (such as LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (such as a base station 105, a UE 115) to shape or steer an antenna beam (for example, a transmit beam, a receive beam, or both) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (such as low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support multi-DCI message handling for multiple CORESET groups, where each CORESET group may be associated with a TRP of a set of multiple TRPs. Additionally, or alternatively, the wireless communications system 100 may support CBG-based transmissions, skipping rules, or both. If implementing CBG-based transmissions, a base station 105 may transmit, to a UE 115, a configuration for a downlink control channel monitoring occasion. The configuration may include multiple CORESETs for the UE 115, where each CORESET is associated with one CORESET group of a set of CORESET groups, one TRP of a set of total TRPs, or both. Each CORESET may further be associated with one of a set of configured downlink CCs. In some examples, the different CORESET groups, different TRPs, or both are indicated using higher layer indexes (such as a CORESET-PoolIndex). The configuration may further configure the UE 115 to implement a dynamic feedback codebook. The UE 115 may receive the configuration and may identify that one or more of the downlink CCs are configured CBG-based transmission. The base station 105 may transmit DCI in one or more of the CORESETs to the UE 115, and the UE 115 may generate, according to the dynamic feedback codebook, one or more feedback messages relating to one or more downlink data messages scheduled by the DCI, where the one or more feedback messages are based on the association between the CORESETs, the CORESET groups, and the downlink CCs configured for CBG-based transmission. The UE 115 may transmit the one or more generated feedback messages to the base station 105.

If implementing skipping rules, a base station 105 may transmit, to a UE 115, a configuration for a downlink control channel monitoring occasion including multiple CORESETs corresponding to multiple CORESET groups associated with multiple TRPs, where the configuration indicates for the UE 115 to implement a semi-static feedback codebook. The base station 105 may additionally transmit a downlink message to the UE 115 associated with a feedback procedure. For example, the base station 105 may transmit a DCI message in a first CORESET of the downlink control channel monitoring occasion corresponding to a first TRP (first CORESET group) or a downlink data message in a first downlink data occasion corresponding to the first TRP (first CORESET group). The UE 115 may determine to apply a skipping rule for HARQ feedback based on the received downlink message. In some examples, the UE 115 may apply the skipping rule per TRP. In some other examples, the UE 115 may apply the skipping rule across all of the configured TRPs. The UE 115 may generate, for the feedback procedure, a feedback message including a one-bit acknowledgement indication (for example, based on a semi-static HARQ codebook for reporting a single bit of ACK/NACK information) based on the downlink message and the configuration for the downlink control channel monitoring occasion including the multiple CORESETs corresponding to the multiple CORESET groups associated with the different TRPs. The UE 115 may transmit the feedback message, including the one-bit acknowledgement indication, to the base station 105.

Figure 2:
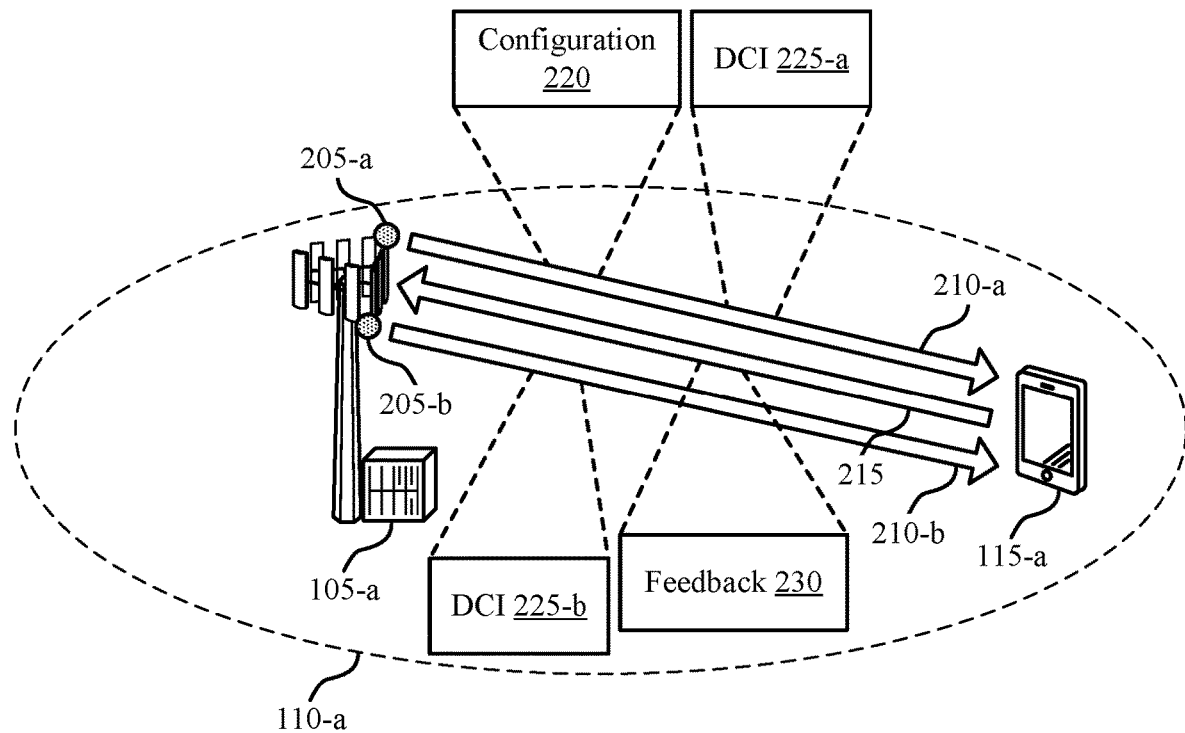

FIG. 2 illustrates an example of a wireless communications system 200 that supports multi-DCI message handling for multiple CORESET groups. In some examples, the wireless communications system 200 may implement aspects of the wireless communication systems 100. The wireless communications system 200 may include a base station 105-a and a UE 115-a, which may be examples of the corresponding devices described with reference to FIG. 1. The base station 105-a and the UE 115-a may support multi-TRP transmission and may communicate over one or more downlink channels (for example, downlink channels 210-a and 210-b) and one or more uplink channels (for example, uplink channel 215). The UE 115-a may communicate with multiple TRPs 205 corresponding to multiple CORESET groups, such as a TRP 205-a and a TRP 205-b. In some implementations, as illustrated, the TRPs 205-a and 205-b may be located at a same base station 105-a (for example, at different antenna panels at the base station 105-a or at a same antenna panel at the base station 105-a). In some other implementations, the TRPs 205-a and 205-b may be located at different base stations 105. In some examples, TRPs 205 may be referred to as CORESET groups. That is, each CORESET groups may be associated with a different TRP (such as TRP 205-a may be associated with a first CORESET group and TRP 205-b may be associated with a second CORESET group).

The wireless communications system 200 may support a multi-DCI-based design, such as a two-DCI-based design. In a two-DCI-based design, a first TRP 205-a may transmit a first DCI message 225-a, such as a physical downlink control channel (PDCCH) message in a first CORESET, scheduling a first downlink data message, such as a physical downlink shared channel (PDSCH) message, for the UE 115-a. A second TRP 205-b may transmit a second DCI message 225-b scheduling a second downlink data message for the UE 115-a in a second CORESET. The wireless communications system 200 may support an ideal—or nearly ideal, with an insignificant backhaul latency—or non-ideal backhaul condition between the TRPs 205-a and 205-b.

The UE 115-a may measure for the DCI messages 225 from the base station 105-a in one or more CORESETs. The UE 115-a may use different CORESETs included within different CORESET groups to monitor and receive DCI messages 225 from different TRPs 205. In some examples, the UE 115-a may monitor a configured number of CORESETs (such as three CORESETs, five CORESETs, etc.). The TRPs 205 may be differentiated at the UE 115-a based on different CORESET groups. For example, a higher layer signaling index per CORESET may group the total set of CORESETs into multiple groups of CORESETs. The number of groups may be based on the number of supported TRPs 205. For example, to support TRP 205-a and TRP 205-b, the base station 105-a may group the CORESETs configured for the UE 115-a into two groups (such as a first CORESET group and a second CORESET group). A first subset of the CORESETs—that is, a first CORESET group—may correspond to a higher layer signaling index of 0 (and, correspondingly, a first TRP 205-a), while a second subset of the CORESETs—that is, a second CORESET group—may correspond to a higher layer signaling index of 1 (and, correspondingly, a second TRP 205-b). For example, the higher layer signaling index of 0 may be an example of a CORESETPoolIndex with value 0 and the higher layer signaling index of 1 may be an example of a CORESETPoolIndex with value 1. In some implementations, based on this CORESET grouping, different TRPs 205 may be transparent to the UE 115-a. Instead, the UE 115-a may identify DCI messages 225 received in CORESETs with different higher layer indexes (for example, without explicitly correlating these DCI messages 225 back to different TRPs 205). For example, the UE 115-a may associate DCI messages 225 received in CORESETs with CORESET groups (in some examples, based on a CORESETPoolIndex), rather than with TRPs 205.

The UE 115-a may provide feedback 230 to the base station 105-a in response to downlink data messages scheduled by the TRPs 205-*a* and 205-*b*. This feedback 230 may be an example of HARQ feedback, including positive acknowledgement/negative acknowledgement (ACK/NACK) information. To provide feedback 230 for downlink data messages from multiple TRPs 205 corresponding to different CORESET groups, the UE 115-*a* may transmit joint ACK/NACK feedback or separate ACK/NACK feedback for the different TRPs 205. In some examples, the base station 105-*a* may transmit a configuration 220 to the UE 115-*a* configuring the UE 115-*a* to implement either joint or separate feedback for multiple TRPs 205.

The UE 115-*a* may transmit joint ACK/NACK feedback for both of the TRPs 205 (for example, for multiple CORESET groups) on a same uplink resource, such as a same physical uplink control channel (PUCCH) resource. In some implementations, the UE 115-*a* may apply joint ACK/NACK feedback techniques when the TRPs 205-*a* and 205-*b* support ideal backhaul. If using a dynamic feedback codebook, such as a dynamic HARQ-Acknowledgement (HARQ-Ack or Type 2) codebook, to generate a feedback message for the joint ACK/NACK feedback, the UE 115-*a* may track DAI values (for example, including both counter DAI (cDAI) and total DAI (tDAI) values) jointly or separately for the different TRPs 205-*a* and 205-*b*. If using a semi-static feedback codebook, such as a semi-static HARQ-Ack (Type 1) codebook, to generate the feedback message for the joint ACK/NACK feedback, the UE 115-*a* may concatenate HARQ ACK/NACK information bits of candidate data reception occasions corresponding to different TRPs 205-*a* and 205-*b*. For example, the UE 115-*a* may concatenate feedback information across CORESETs with different configured higher layer indexes (such as different CORESETPoolIndexes) to generate the joint feedback message using the semi-static codebook.

Additionally, or alternatively, the UE 115-*a* may transmit separate ACK/NACK feedback for the TRPs 205 (for different CORESET groups) on separate uplink resources, such as different PUCCH resources. In some implementations, the UE 115-*a* may apply separate ACK/NACK feedback techniques when the TRPs 205-*a* and 205-*b* support ideal backhaul or support non-ideal backhaul. If using a dynamic feedback codebook, such as a dynamic HARQ Type 2 codebook, to generate a feedback message for the separate ACK/NACK feedback, the UE 115-*a* may track DAI values (for example, including both cDAI and tDAI values) separately for the different TRPs 205-*a* and 205-*b*. If using a semi-static feedback codebook, such as a semi-static HARQ Type 1 codebook, to generate the feedback message for the separate ACK/NACK feedback, the UE 115-*a* may determine candidate data reception occasions and feedback bits separately for the different TRPs 205-*a* and 205-*b*. For example, the UE 115-*a* may determine candidate PDSCH reception occasions and HARQ ACK/NACK information bits independently for PDSCH messages corresponding to DCI messages 225 received in CORESETs with different configured values for the higher layer signaling index.

To support multiple-PDCCH-based multi-TRP transmission, multi-panel transmission, or both for intra-cell (same cell identifier (ID)) communication, inter-cell (different cell IDs) communication, or both, a base station 105-*a* may implement radio resource control (RRC) signaling to configure the UE 115-*a*. The base station 105-*a* may use the RRC configuration to link PDCCH/PDSCH pairs to respective TRPs 205 of the multiple TRPs 205. For example, one CORESET in a "PDCCH-config" may correspond to one TRP 205. The base station 105-*a* may transmit this RRC configuration 220 to the UE 115-*a*, for example, in an RRC message.

For separate ACK/NACK feedback for PDSCH messages received from different TRPs 205 corresponding to different CORESET groups, the UE 115-*a* may generate separate ACK/NACK codebooks identified by an index (for example, a higher layer signaling index per CORESET) if the index is configured and applied across all CCs. If the higher layer signaling index per CORESET is configured, the UE 115-*a* may generate separate ACK/NACK codebooks across all CCs for multi-DCI-based multi-TRP transmission. Configured higher layer signaling indexes corresponding to different ACK/NACK codebooks may have different values. For a dynamic codebook, the UE 115-*a* may perform cDAI and tDAI counting independently for DCI messages 225 from CORESETs with different values of configured higher layer signaling indexes.

For joint ACK/NACK feedback for PDSCH messages received from different TRPs 205 corresponding to different CORESET groups, the UE 115-*a* may support either a dynamic HARQ-Ack codebook or a semi-static HARQ-Ack codebook. If implementing a joint dynamic HARQ-Ack codebook for multiple TRPs 205, the UE 115-*a* may select (or be configured to) jointly or separately count DAIs for different TRPs 205. For example, in a first aspect, the UE 115-*a* may jointly count cDAI across multiple TRPs 205 and the tDAI may track the total number of DCI messages 225 in a PDCCH monitoring occasion across CCs and TRPs 205. In a second aspect, the UE 115-*a* may count cDAI per TRP 205 and the tDAI may track the number of DCI messages 225 in a PDCCH monitoring occasion across CCs for each TRP 205. The UE 115-*a* may concatenate the HARQ information bits by the increasing order of TRPs 205 (for example, from a lowest higher layer index configured for a CORESET to a highest higher layer index configured for a CORESET) to generate a joint feedback message. If implementing a joint semi-static HARQ-Ack codebook for multiple TRPs 205, the UE 115-*a* may concatenate HARQ information bits by the increasing order of PDSCH reception occasion index first, then the serving cell index, and then the higher layer index value (i.e., by TRP). In some other examples, the UE 115-*a* may concatenate the HARQ information bits according to other orders.

In some implementations, the wireless communications system 200 may support other feedback techniques in addition to the multi-DCI feedback for multiple CORESET groups corresponding to different TRPs. For example, the wireless communications system 200 may support CBG-based transmissions and feedback for CBG-based transmissions across one or more TRPs 205. Additionally, or alternatively, the wireless communications system 200 may support skipping rules for feedback payload reduction across one or more TRPs 205. In some examples, the base station 105-*a* may configure the UE 115-*a* for one or more of these procedures. For example, the base station 105-*a* may transmit the configuration 220 to the UE 115-*a* configuring the UE 115-*a* for a feedback process. The configuration 220, which may be an example of RRC signaling, may indicate joint or separate feedback messages for different TRPs 205, dynamic or semi-static codebooks for message generation, a CBG-based transmission configuration, one or more skipping rules, or a combination thereof. Additionally, or alternatively, the UE 115-*a* may be configured by an original equipment manufacturer (OEM) with some of this information, such as the skipping rules.

For example, the UE 115-a may support CBG-based ACK/NACK feedback using a Type 2 codebook (i.e., a dynamic HARQ-Ack codebook). In some implementations, the base station 105-a may configure the UE 115-a for these feedback procedures using RRC signaling. For example, one or more downlink serving cells (for example, downlink CCs) may be configured with the RRC parameter "PDSCH-CodeBlockGroupTransmission." In some such implementations, the UE 115-a may use two or more sub-codebooks in order to generate the dynamic HARQ-Ack codebook. The UE 115-a may apply cDAI and tDAI values separately for each HARQ sub-codebook, where the first sub-codebook may correspond to TB-based feedback and the second sub-codebook may correspond to CBG-based feedback.

The first sub-codebook may cover all downlink CCs (when CBG-based ACK/NACK is not used). For example, the UE 115-a may generate ACK/NACK bits per TB for the first sub-codebook for messages in CCs where CBG-based transmission is not configured, for messages scheduled using fallback DCI (for example, a DCI message of DCI format 1_0) in CCs where CBG-based transmission is configured, for messages scheduled using semi-persistent scheduling (SPS), or for some combination thereof. The UE 115-a may input one ACK/NACK bit per location in the sub-codebook, unless the maximum number of codewords scheduled by a DCI message 225 is more than one (for example, two), in which case the UE 115-a may input multiple bits (for example, two bits) for each location.

The second sub-codebook may cover all downlink CCs that are configured with CBG-based ACK/NACK. In some examples, different CCs may be configured with different numbers of CBGs. The UE 115-a may use a maximum number of CBGs across these CCs and may generate an ACK/NACK bit per CBG for feedback. The UE 115-a may input the maximum CBG number of ACK/NACK bit per location in the second sub-codebook.

In some implementations, the UE 115-a may be configured with a number of downlink cells, $N_{cells}^{DL}$, including a subset of cells configured for TB-based transmission, $N_{cells}^{DL,TB}$, and a subset of cells configured for CBG-based transmission, $N_{cells}^{DL,CBG}$, where $N_{cells}^{DL,TB} + N_{cells}^{DL,CBG} = N_{cells}^{DL}$. The UE 115-a may use $N_{cells}^{DL}$ to determine the first HARQ sub-codebook for SPS PDSCH release, SPS PDSCH reception, and TB-based PDSCH receptions scheduled by fallback DCI on the $N_{cells}^{DL,CBG}$ serving cells and for data receptions scheduled using DCI messages 225 (for example, DCI messages of DCI formats 1_0 or 1_1) on the $N_{cells}^{DL,TB}$ serving cells. The UE 115-a may use $N_{cells}^{DL,CBG}$ to determine the second HARQ sub-codebook corresponding to the $N_{cells}^{DL,CBG}$ serving cells for CBG-based PDSCH receptions scheduled using DCI messages 225 of format DCI 1_1.

To support CBG-based ACK/NACK feedback using a dynamic codebook when the UE 115-a is configured with multi-DCI-based multi-TRP in at least one serving cell, the UE 115-a may implement one or more techniques described herein. The base station 105-a may configure the UE 115-a with multiple TRPs 205 in a same downlink CC (for example, two or more CORESETs are configured with different higher layer index values, such as different CORESETPoolIndex values, for a single CC). In some implementations, the same CBG configuration may be common to both TRPs 205 in the CC. For example, the base station 105-a may include a "PDSCH-CodeBlockGroupTransmission" indicator per downlink CC, rather than per TRP 205 or CORESET group, such that the indicator applies for data messages scheduled in different CORESETs within the downlink CC irrespective of the CORESETs associations with the TRPs 205 (for example, the higher layer indexes). In some other implementations, different CBG configurations may be configured for different TRPs 205 in the same downlink CC. For example, the base station 105-a may include a "PDSCH-CodeBlockGroupTransmission" indicator per TRP within each downlink CC. In some such implementations, the DCI size for DCI messages 225 of DCI format 1_1 (i.e., non-fallback DCI) may be different depending on the CORESET in which the DCI message 225 is received by the UE 115-a, as the CBG transmission information (CBGTI) field size may be different. For example, CORESETs configured with a first value of the higher layer index (such as zero) may have a first size for DCI format 1_1, while CORESETs configured with a second value of the higher layer index (such as one) may have a second size for DCI format 1_1.

Figure 3:
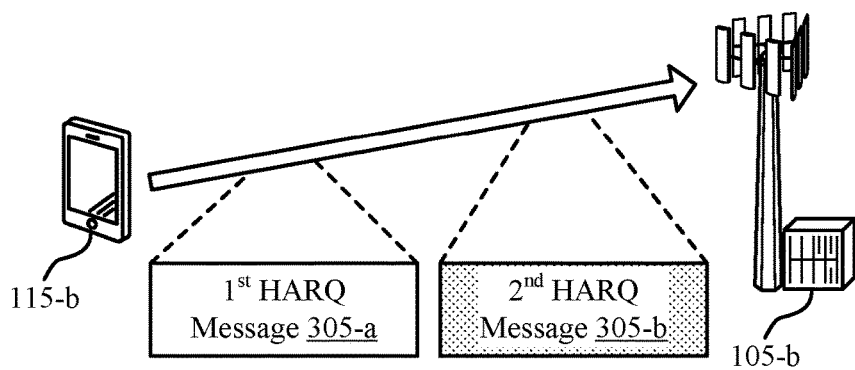
FIGS. 3 and 4 illustrate examples of codebook mapping for code block group (CBG)-based transmission that support multi-DCI message handling for multiple CORESET groups.
Figure 3:
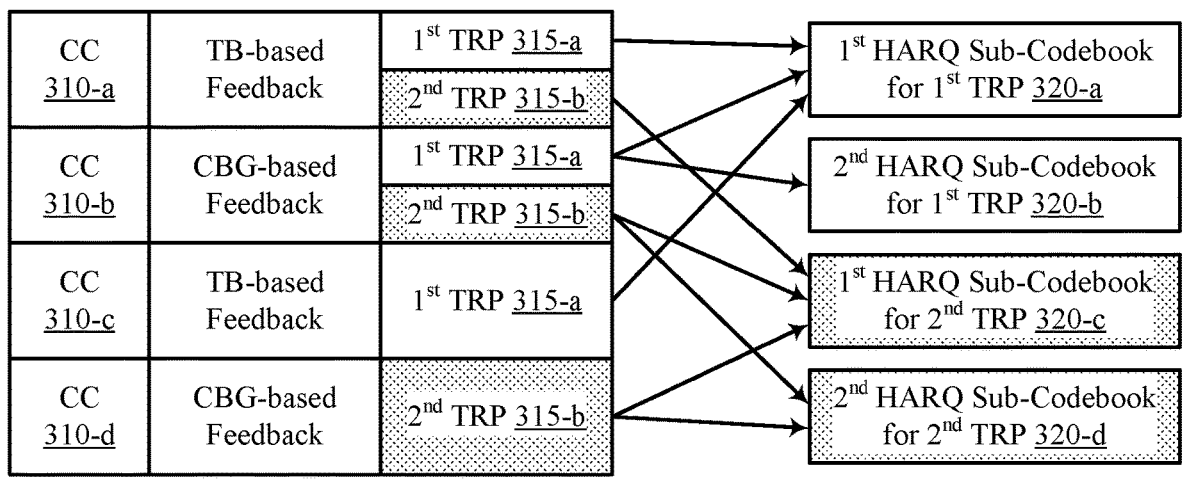
Figure 4:
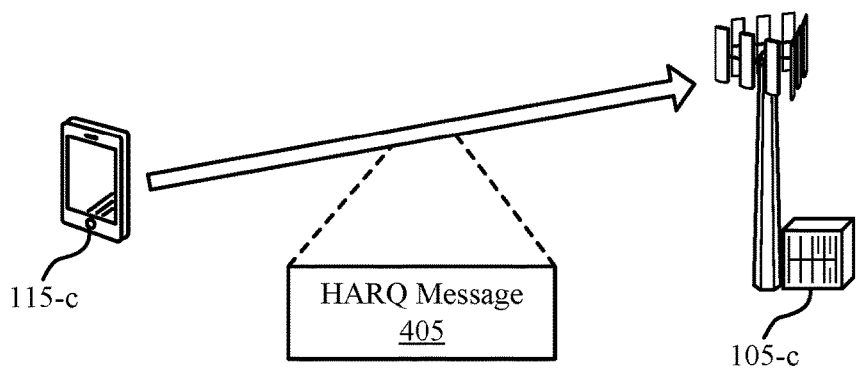
Figure 4:
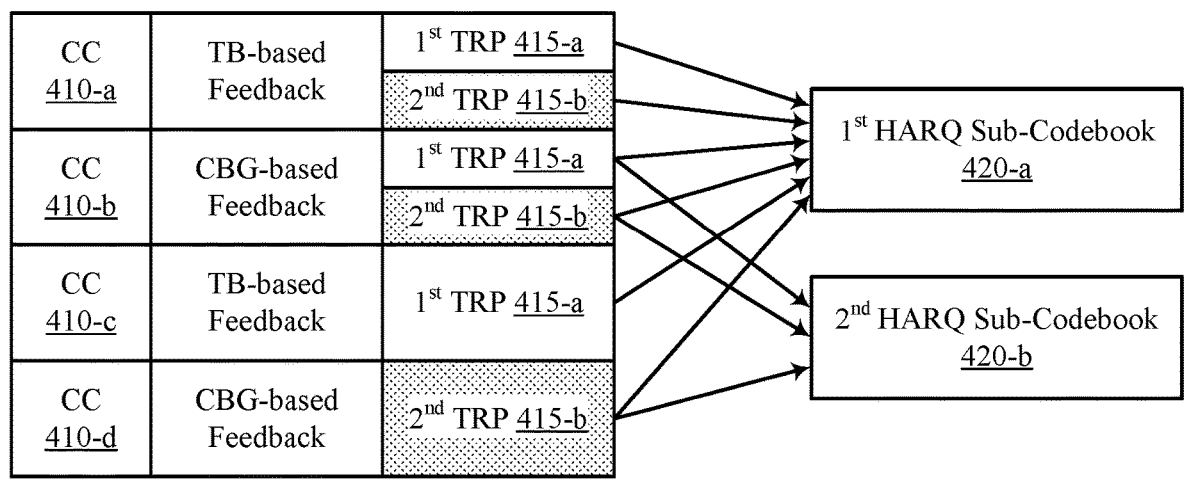

If configured with CBG-based transmission and multi-DCI-based multi-TRP in at least one downlink CC, the UE 115-a may support either separate feedback, as described herein with reference to FIG. 3, or joint feedback, as described herein with reference to FIG. 4, for the downlink transmissions.

In another example, the UE 115-a may support skipping rules for ACK/NACK feedback using a Type 1 codebook (i.e., a semi-static HARQ-Ack codebook). Skipping rules may be examples of special rules applied by the UE 115-a to reduce the payload size of a HARQ feedback message, effectively reducing the signaling overhead on the channel. For example, the UE 115-a may reduce the HARQ payload size by reducing the overhead of the semi-static codebook. The UE 115-a may invoke the skipping rule if the UE 115-a is scheduled to send one bit of feedback 230. By invoking (i.e., applying) the skipping rule, the UE 115-a may use a HARQ ACK/NACK codebook including one bit, rather than use the full semi-static codebook corresponding to the full set of reception occasions. In some implementations, the skipping rule may be conditioned on scheduling by fallback DCI (for example, a DCI message 225 of DCI format 1_0) for PDSCH reception, SPS release, or both. The base station 105-a may indicate cDAI equal to one in the DCI message 225 to invoke the skipping rule. For example, while cDAI may not typically be used for a semi-static codebook, the base station 105-a may use the cDAI in this case to indicate that there is a single DCI message for the UE 115-a to respond to in the monitoring occasion.

The UE 115-a may apply the skipping rule if the UE 115-a reports HARQ ACK/NACK information in an uplink resource for an SPS PDSCH release indicated by DCI format 1_0 with a cDAI field value of 1 on the primary cell (where the ACK/NACK information may be in response to the DCI message 225 for the SPS PDSCH release), for a PDSCH reception scheduled by DCI format 1_0 with a cDAI field value of 1 on the primary cell, or for an SPS PDSCH reception. If the UE 115-a determines to apply the skipping rule, the UE 115-a may determine a HARQ ACK/NACK codebook for the SPS PDSCH release, the PDSCH reception, or the SPS PDSCH reception without using any other reception occasions in the considered window on the respective serving cell to determine the HARQ ACK/NACK codebook. Using such a rule, the UE 115-a may select a semi-static HARQ-Ack codebook with a single field for ACK/NACK indication (for example, rather than a semi-static HARQ-Ack codebook including a number of fields equal to the number of PDSCH reception occasions in a considered window), resulting in a reduced payload size for HARQ feedback.

Figure 5:
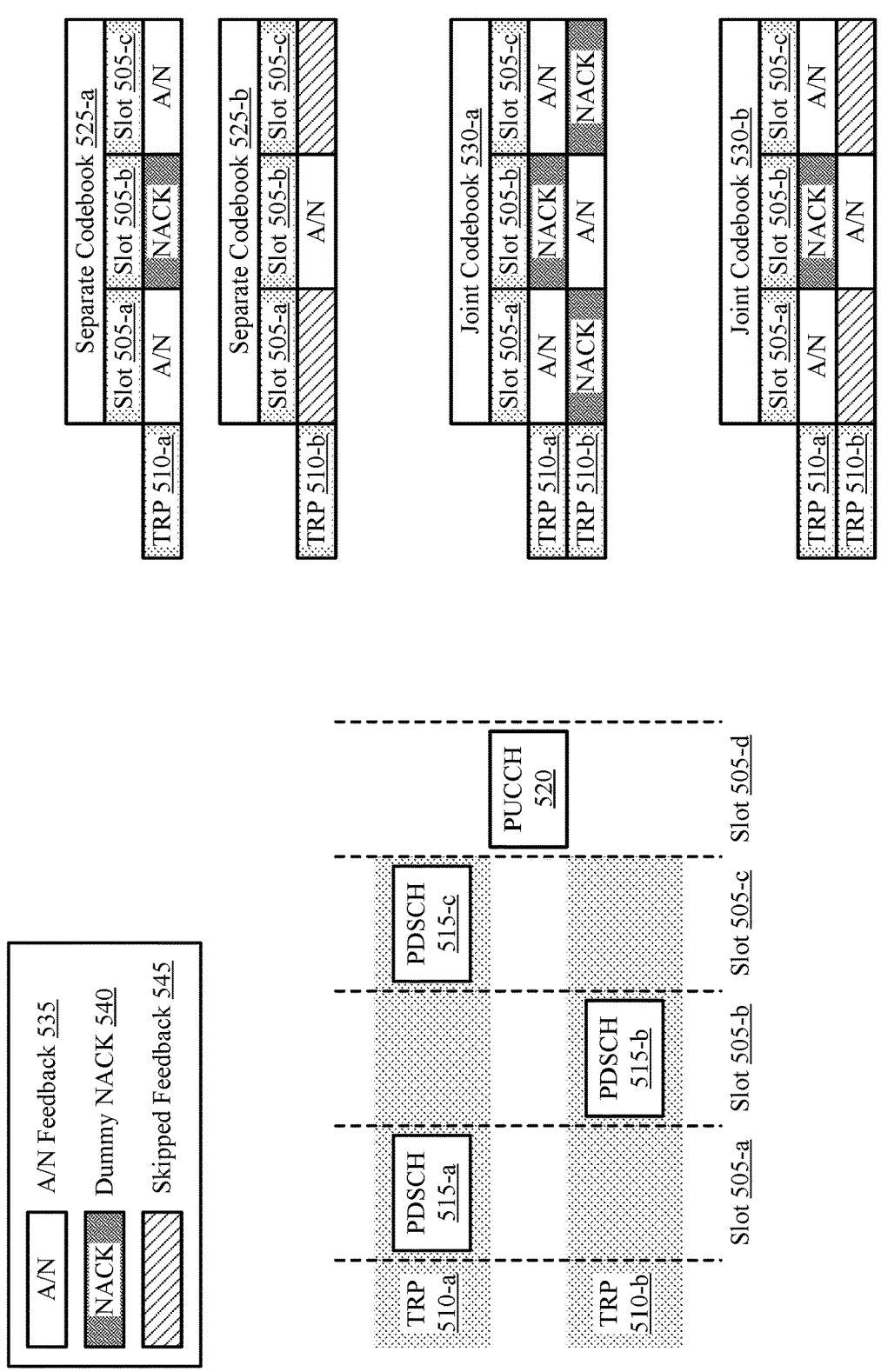
FIG. 5 illustrates an example of codebook mapping for skipping rules that supports multi-DCI message handling for multiple CORESET groups.

If implementing skipping rules and configured with multi-DCI-based multi-TRP, the UE 115-a may support either separate feedback or joint feedback, as described herein with reference to FIG. 5, for the downlink transmissions.

FIG. 3 illustrates an example of codebook mapping 300 for CBG-based transmission that supports multi-DCI message handling for multiple CORESET groups. In some examples, a wireless communications system 100 or 200 may implement the codebook mapping 300. For example, a UE 115-b may use the codebook mapping 300 to generate feedback for transmission to a base station 105-b, which may be examples of the corresponding devices described with reference to FIGS. 1 and 2. In some implementations, the base station 105-b may configure the UE 115-b for separate feedback for different TRPs 315. In some such implementations, the UE 115-b may transmit, to the base station 105-b, a first HARQ message 305-a associated with a first TRP 315-a in a first uplink resource (for example, a first PUCCH resource) and a second HARQ message 305-b associated with a second TRP 315-b in a second uplink resource (for example, a second PUCCH resource). In some examples, the TRPs 315 may be referred to as CORESET groups. That is, each CORESET group may be associated with a different TRP 315, such that the first TRP 315-a may be associated with a first CORESET group and the second TRP 315-b may be associated with a second CORESET group.

In some wireless communications systems, the base station 105-b may configure the UE 115-b with multi-DCI-based multi-TRP in at least one downlink serving cell. For example, as illustrated, the base station 105-b may configure the UE 115-b with multiple TRPs 315-a and 315-b in CCs 310-a and 310-b. In some examples, the base station 105-b may further configure the UE 115-b with a single TRP 315 in any number of downlink serving cells, such as CCs 310-c and 310-d. Additionally, the base station 105-b may configure the UE 115-b for separate dynamic HARQ feedback for the TRPs 315-a and 315-b and with CBG-based transmission in at least one downlink serving cell. For example, the base station 105-b may configure the UE 115-b for CBG-based transmission—and, correspondingly, CBG-based feedback—in CCs 310-b and 310-d. The other CCs 310 (for example, CCs 310-a and 310-c) may support TB-based feedback.

The UE 115-b may generate two or more sub-codebooks 320 for the HARQ feedback corresponding to the first TRP 315-a (for example, corresponding to a first value of a higher layer index, such as a CORESETPoolIndex). The UE 115-b may determine a first sub-codebook 320-a, which may be referred to as a TB-based sub-codebook, based on the values of the cDAI and tDAI in the DCI messages received by the UE 115-b across all CCs 310 that are configured with one or more CORESETs with the first value of the higher layer index (i.e., corresponding to the first TRP 315-a). Specifically, the UE 115-b may use the $N_{cells,TRP}^{DL}$ specific to a particular TRP. For example, for TRP=0, the UE 115-b may use $N_{cells,0}^{DL}$ to determine the first HARQ sub-codebook 320-a for SPS PDSCH release, SPS PDSCH reception, and TB-based PDSCH receptions scheduled by fallback DCI on the $N_{cells,0}^{DL,CBG}$ serving cells and for data receptions scheduled using DCI messages (for example, DCI messages of DCI formats 1_0 or 1_1) on the $N_{cells,0}^{DL,TB}$ serving cells. Accordingly, the UE 115-b may determine the first HARQ sub-codebook 320-a for the first TRP 315-a based on downlink messages received for the first TRP 315-a in the CC 310-a, downlink messages received for the first TRP 315-a in the CC 310-b, and downlink messages received for the first TRP 315-a in the CC 310-c.

The UE 115-b may determine a second sub-codebook 320-b, which may be referred to as a CBG-based sub-codebook, based on the values of the cDAI and tDAI in the DCI messages received by the UE 115-b across all CCs 310 that are configured with one or more CORESETs with the first value of the higher layer index (i.e., corresponding to the first TRP 315-a) and also are configured with CBG-based transmission. The size of feedback bits for each cDAI position in this second sub-codebook 320-b may be based on a greatest number of configured CBGs across these CCs 310 (for example, for the first TRP 315-a). Specifically, the UE 115-b may use the $N_{cells,TRP}^{DL,CBG}$ specific to a particular TRP. For example, for TRP=0, the UE 115-b may use $N_{cells,0}^{DL,CBG}$ to determine the second HARQ sub-codebook 320-b corresponding to the $N_{cells,0}^{DL,CBG}$ serving cells for CBG-based PDSCH receptions scheduled using DCI messages of format DCI 1_1. Accordingly, the UE 115-b may determine the second HARQ sub-codebook 320-b for the first TRP 315-a based on downlink messages received for the first TRP 315-a in the CC 310-b.

The UE 115-b may use similar techniques to determine the sub-codebooks 320 for the second TRP 315-b (for example, corresponding to a second value of a higher layer index, such as a CORESETPoolIndex). For example, the UE 115-b may determine a TB-based sub-codebook 320-c for the second TRP 315-b (i.e., a second higher layer index value) based on the $N_{cells,1}^{DL}$ cells and a CBG-based sub-codebook 320-d for the second TRP 315-b (i.e. the second higher layer index value) based on the $N_{cells,1}^{DL,CBG}$ cells. The UE 115-b may determine the third HARQ sub-codebook 320-c (i.e., the first HARQ sub-codebook 320-c for the second TRP 315-b) based on downlink messages received for the second TRP 315-b in the CC 310-a, downlink messages received for the second TRP 315-b in the CC 310-b, and downlink messages received for the second TRP 315-b in the CC 310-d. Additionally, the UE 115-b may determine the fourth HARQ sub-codebook 320-d (i.e., the second HARQ sub-codebook 320-d for the second TRP 315-b) based on downlink messages received for the second TRP 315-b in the CC 310-b and downlink messages received for the second TRP 315-b in the CC 310-d.

To support the feedback procedure described herein, the UE 115-b may perform separate counting processes for DAIs for the different TRPs 315 associated with different CORESET groups. For example, the UE 115-b may track four independent DAI values for both cDAI and tDAI, including TB-based cDAI for the first TRP 315-a, TB-based tDAI for the first TRP 315-a, CBG-based cDAI for the first TRP 315-a, CBG-based tDAI for the first TRP 315-a, TB-based cDAI for the second TRP 315-b, TB-based tDAI for the second TRP 315-b, CBG-based cDAI for the second TRP 315-b, and CBG-based tDAI for the second TRP 315-b.

For separate feedback, the UE 115-b may determine a first dynamic HARQ-Ack codebook for the first TRP 315-a using the first sub-codebook 320-a and the second sub-codebook 320-b and may determine a second dynamic HARQ-Ack codebook for the second TRP 315-b using the third sub-codebook 320-c and the fourth sub-codebook 320-d. The UE 115-b may generate a first HARQ message 305-a using the first dynamic HARQ-Ack codebook and may generate a second HARQ message 305-b using the second dynamic HARQ-Ack codebook. The UE 115-b may transmit the first HARQ message 305-a and the second HARQ message 305-b in separate PUCCH resources to the base station 105-b.

Alternatively, the UE 115-*b* may apply separate DAI counting as described herein for joint feedback. For example, the UE 115-*b* may determine a dynamic HARQ-Ack codebook for both TRPs 315-*a* and 315-*b* using the first sub-codebook 320-*a*, the second sub-codebook 320-*b*, the third sub-codebook 320-*c*, and the fourth sub-codebook 320-*d*. The UE 115-*b* may generate a HARQ message 305 using the dynamic HARQ-Ack codebook and may transmit the HARQ message 305 to the base station 105-*b* in a PUCCH resource.

As illustrated, CBG-based transmission may be configured at the CC 310 level. Alternatively, CBG-based transmission may be configured at the TRP 315 level within CCs 310. For example, for the CC 310-*a*, the first TRP 315-*a* may be configured for CBG-based transmission, while the second TRP 315-*b* may not be configured for CBG-based transmission. Additionally, or alternatively, CBG sizes may vary across TRPs 315, CCs 310, or both. For example, the CBG size for the second TRP 315-*b* in the CC 310-*b* may be different than the CBG size for the second TRP 315-*b* in the CC 310-*d*. Additionally, or alternatively, the CBG size for the first TRP 315-*a* in the CC 310-*b* may be different than the CBG size for the second TRP 315-*b* in the CC 310-*b*. The illustrated configurations are examples, and many other configurations may be supported by a wireless communications system.

FIG. 4 illustrates an example of codebook mapping 400 for CBG-based transmission that supports multi-DCI message handling for multiple CORESET groups. In some examples, the codebook mapping 400 may implement aspects of a wireless communications system 100 or 200. In some examples, a wireless communications system 100 or 200 may implement the codebook mapping 400. For example, a UE 115-*c* may use the codebook mapping 400 to generate feedback for transmission to a base station 105-*c*, which may be examples of the corresponding devices described with reference to FIGS. 1 and 2. In some implementations, the base station 105-*c* may configure the UE 115-*c* for joint feedback for different TRPs 415. In some such implementations, the UE 115-*c* may transmit, to the base station 105-*c* in an uplink resource (for example, a PUCCH resource), a joint HARQ message 405 associated with both a first TRP 415-*a* and a second TRP 415-*b*. In some examples, the TRPs 415 may be referred to as CORESET groups. That is, each CORESET group may be associated with a different TRP 415. For example, a first TRP 415-*a* may be associated with a first CORESET group and a second TRP 415-*b* may be associated with a second CORESET group.

In some wireless communications systems, the base station 105-*c* may configure the UE 115-*c* with multi-DCI-based multi-TRP in at least one downlink serving cell. For example, as illustrated, the base station 105-*c* may configure the UE 115-*c* with multiple TRPs 415-*a* and 415-*b* in CCs 410-*a* and 410-*b*. In some examples, the base station 105-*c* may further configure the UE 115-*c* with a single TRP 415 in any number of downlink serving cells, such as CCs 410-*c* and 410-*d*. Additionally, the base station 105-*c* may configure the UE 115-*c* for joint dynamic HARQ feedback for the TRPs 415-*a* and 415-*b* and with CBG-based transmission in at least one downlink serving cell. For example, the base station 105-*c* may configure the UE 115-*c* for CBG-based transmission—and, correspondingly, CBG-based feedback—in CCs 410-*b* and 410-*d*. The other CCs 410 (for example, CCs 410-*a* and 410-*c*) may support TB-based feedback.

The UE 115-*c* may generate two or more sub-codebooks 420 for the HARQ feedback corresponding to the set of TRPs 415 (for example, both the first TRP 415-*a* and the second TRP 415-*b* associated with a first CORESET group and a second CORESET group, respectively). The UE 115-*c* may determine a first sub-codebook 420-*a*, which may be referred to as a TB-based sub-codebook, based on the values of the cDAI and tDAI in the DCI messages received by the UE 115-*c* across all CCs 410 as well as across all higher layer indexes (i.e., corresponding to the set of TRPs 415). For example, for a set of two TRPs 415 including TRP=0 and TRP=1, the UE 115-*c* may use $N_{cells,0}^{DL}+N_{cells,1}^{DL}$ to determine the first HARQ sub-codebook 420-*a* for SPS PDSCH release, SPS PDSCH reception, and TB-based PDSCH receptions scheduled by fallback DCI on the $N_{cells,0}^{DL,CBG}+N_{cells,1}^{DL,CBG}$ serving cells and for data receptions scheduled using DCI messages (for example, DCI messages of DCI formats 1_0 or 1_1) on the $N_{cells,0}^{DL,TB}+N_{cells,1}^{DL,TB}$ serving cells, where $N_{cells,0}^{DL}$ is the number of downlink CCs 410 that are configured with one or more CORESETs with a first value (i.e., 0) of the higher layer index and $N_{cells,1}^{DL}$ is the number of downlink CCs 410 that are configured with one or more CORESETs with a second value (i.e., 1) of the higher layer index. Accordingly, the UE 115-*c* may determine the first HARQ sub-codebook 420-*a* for the TRPs 415-*a* and 415-*b* based on downlink messages received for the first TRP 415-*a* in the CC 410-*a*, downlink messages received for the first TRP 415-*a* in the CC 410-*b*, downlink messages received for the first TRP 415-*a* in the CC 410-*c*, downlink messages received for the second TRP 415-*b* in the CC 410-*a*, downlink messages received for the second TRP 415-*b* in the CC 410-*b*, and downlink messages received for the second TRP 415-*b* in the CC 410-*d*.

The UE 115-*c* may determine a second sub-codebook 420-*b*, which may be referred to as a CBG-based sub-codebook, based on the values of the cDAI and tDAI in the DCI messages received by the UE 115-*c* across all CCs 410 as well as across all higher layer indexes (i.e., corresponding to the set of TRPs 415) that are also configured with CBG-based transmission. The size of feedback bits for each cDAI position in this second sub-codebook 420-*b* may be based on a greatest number of configured CBGs across these CCs 410 and across all higher layer indexes if separate CBG-based configuration per TRP 415 in each CC 410 is supported. For example, for a set of two TRPs 415 including TRP=0 and TRP=1, the UE 115-*c* may use $N_{cells,0}^{DL,CBG}+N_{cells,1}^{DL,CBG}$ to determine the second HARQ sub-codebook 420-*b* corresponding to the $N_{cells,0}^{DL,CBG}+N_{cells,1}^{DL,CBG}$ serving cells for CBG-based PDSCH receptions scheduled using DCI messages of format DCI 1_1. As described herein, $N_{cells,0}^{DL,CBG}$ is the number of downlink CCs 410 that are configured with one or more CORESETs with a first value (i.e., 0) of the higher layer index and are configured with CBG-based transmission, and $N_{cells,1}^{DL,CBG}$ is the number of downlink CCs 410 that are configured with one or more CORESETs with a second value (i.e., 1) of the higher layer index and are configured with CBG-based transmission. Accordingly, the UE 115-*c* may determine the second HARQ sub-codebook 420-*b* for the TRPs 415-*a* and 415-*b* based on downlink messages received for the first TRP 415-*a* in the CC 410-*b*, downlink messages received for the second TRP 415-*b* in the CC 410-*b*, and downlink messages received for the second TRP 415-*b* in the CC 410-*d*.

To support the feedback procedure described herein, the UE 115-*c* may perform joint counting processes for DAIs for the different TRPs 415. For example, the UE 115-*c* may track two independent DAI values for both cDAI and tDAI, including TB-based cDAI for the set of TRPs 415, TB-based tDAI for the set of TRPs 415, CBG-based cDAI for the set of TRPs 415, and CBG-based tDAI for the set of TRPs 415. The UE 115-*c* may determine a dynamic HARQ-Ack codebook for both TRPs 415-*a* and 415-*b* using the first sub-codebook 420-*a* and the second sub-codebook 420-*b*. The UE 115-*c* may generate a HARQ message 405 using the dynamic HARQ-Ack codebook and may transmit the HARQ message 405 to the base station 105-*c* in a PUCCH resource.

As described with reference to FIG. 3, the illustrated configurations are examples, and many other configurations may be supported by a wireless communications system.

FIG. 5 illustrates an example of codebook mapping 500 for skipping rules that supports multi-DCI message handling for multiple CORESET groups. In some examples, a wireless communications system 100 or 200 may implement the codebook mapping 500. For example, a UE 115 may use the codebook mapping 500 to generate feedback for transmission to a base station 105, which may be examples of the corresponding devices described with reference to FIGS. 1 and 2. In some implementations, the UE 115 may be configured for semi-static feedback and may implement one or more skipping rules for dropping feedback bits, reducing the size of a semi-static feedback codebook. For example, if the UE 115 utilizes a codebook with a smaller size than a configured semi-static codebook (for example, based on the full number of reception opportunities), the UE 115 may reduce encoding complexity and signaling overhead on an uplink channel. In some examples, the TRPs 510 may be referred to as CORESET groups. That is, each CORESET group may be associated with a different TRP 510 (such as a first TRP 510-*a* may be associated with a first CORESET group and a second TRP 510-*b* may be associated with a second CORESET group).

A UE 115 may be configured with multi-DCI-based multi-TRP. For example, the UE 115 may monitor for multiple DCI messages in multiple CORESETs corresponding to multiple CORESET groups and TRPs 510. The DCI messages may schedule downlink data transmissions in PDSCH reception occasions 515. The UE 115 may monitor for the scheduled downlink data transmissions in the PDSCH reception occasions 515 and may transmit HARQ feedback to base station 105 in response to the scheduled downlink data transmissions. For example, the UE 115 may transmit a positive acknowledgement (ACK) if a downlink data transmission is successfully received and decoded at the UE 115 and otherwise may transmit a negative acknowledgement (NACK). The UE 115 may transmit feedback for multiple messages in a single feedback message using a codebook. For example, the UE 115 may input ACK/NACK information for multiple PDSCH reception occasions 515 across a set of slots 505 into a semi-static codebook to determine a feedback message for transmission.

As illustrated, the UE 115 may receive DCI messages scheduling PDSCH transmissions. For example, DCI messages in CORESETs corresponding to a first TRP 510-*a* may schedule downlink messages in a first PDSCH reception occasion 515-*a* and in a third PDSCH reception occasion 515-*c*. Additionally, a DCI message in a CORESET corresponding to a second TRP 510-*b* may schedule a downlink message in a second PDSCH reception occasion 515-*b*. These DCI messages may indicate a single feedback opportunity (or multiple feedback opportunities in a same slot 505 for separate feedback) in a PUCCH opportunity 520. For example, each DCI message may include a PDSCH-to-HARQ value (i.e., a K1 value) indicating the number of slots after the scheduled PDSCH message in which the UE 115 can transmit feedback for the PDSCH message. The DCI scheduling the first downlink message in a first slot 505-*a*, slot n−3, may include a K1 value of 3, the DCI scheduling the second downlink message in a second slot 505-*b*, slot n−2, may include a K1 value of 2, and the DCI scheduling the third downlink message in a third slot 505-*c*, slot n−1, may include a K1 value of 1, such that all of these DCI message point to a slot 505-*d*, slot n, for transmitting HARQ feedback. In some examples, the UE 115 may be configured with one CC and a maximum of one PDSCH reception occasion 515 per slot 505 per TRP 510. In some other examples, the UE 115 may be configured with other numbers of CCs, PDSCH reception occasions 515, TRPs 510, etc.

In some implementations, a UE 115 may be configured (for example, by a base station 105 via RRC signaling) to provide separate feedback for different TRPs 510 (for different CORESET groups) using semi-static HARQ feedback. For example, the UE 115 may transmit multiple feedback messages based on separate codebooks 525 in different PUCCH resources 520. For HARQ feedback corresponding to multiple TRPs 510, the UE 115 may determine a skipping rule per TRP 510. For example, the UE 115 may determine to transmit a one-bit acknowledgement indicator rather than a full semi-static codebook separately for each TRP 510. As illustrated, the UE 115 may monitor for multiple scheduled downlink data messages corresponding to the first TRP 510-*a* in the PDSCH reception occasions 515-*a* and 515-*c*. Accordingly, the UE 115 may send more than one bit of feedback to indicate ACK/NACK information for both of these downlink data messages. The UE 115 may determine a separate codebook 525-*a* for the first TRP 510-*a*, where the separate codebook 525-*a* includes ACK/NACK feedback 535 for the first slot 505-*a*, a dummy NACK 540 for the second slot 505-*b*, and ACK/NACK feedback 535 for the third slot 505-*c*. Additionally, the UE 115 may monitor for a single scheduled downlink data message corresponding to TRP 510-*b* in the PDSCH reception occasion 515-*b*. The UE 115 may determine to apply a skipping rule for the second TRP 510-*b* based on the downlink data message scheduled for the PDSCH reception occasion 515-*b*. Accordingly, the UE 115 may determine a separate codebook 525-*b* for the second TRP 510-*b*, where the separate codebook 525-*b* includes a single field for ACK/NACK information corresponding to the second slot 505-*b*. The UE 115 may skip feedback 545 for slots 505-*a* and 505-*c* based on the skipping rule. As such, the UE 115 may transmit two HARQ messages in the separate feedback procedure, where the first HARQ message for the first TRP 510-*a* is a standard or full-size HARQ message based on a full-size semi-static codebook and the second HARQ message for the second TRP 510-*b* is a reduced-size HARQ message based on a single feedback bit (for example, a 1 bit if the UE 115 successfully receives and decodes the downlink message in the PDSCH reception occasion 515-*b* or a 0 bit the UE 115 does not successfully receive or decode the downlink message).

The UE 115 may determine to apply the skipping rule for the second TRP 510-*b* feedback based on the downlink data for the second TRP 510-*b* being scheduled for the PDSCH reception occasion 515-*b* by fallback DCI (for example, a DCI message of a DCI format 1_0) with a cDAI value of 1. In some implementations, the UE 115 may apply the skipping rule if the UE 115 reports HARQ feedback for a single SPS release scheduled by a fallback DCI message with a cDAI value of 1 (where the feedback is in response to the DCI message indicating the SPS release), a single PDSCH reception scheduled by a fallback DCI message with a cDAI value of 1, or a single SPS PDSCH reception for a particular TRP 510. If the UE 115 is scheduled with a single SPS release, PDSCH reception, or SPS PDSCH reception as described above associated with a corresponding value of a higher layer index (i.e., for a particular TRP 510), the UE 115 may determine to skip transmitting HARQ feedback for other candidate reception occasions. For example, for the second TRP 510-*b*, rather than use a full semi-static codebook for the separate codebook 525-*b* including dummy NACKs 540 for slots 505-*a* and 505-*c*, the UE 115 may report a one-bit ACK/NACK for slot 505-*b* corresponding to the PDSCH reception occasion 515-*b*.

In some other implementations, the UE 115 may be configured (for example, by a base station 105 via RRC signaling) to provide joint feedback for different TRPs 510 (for different CORESET groups) using semi-static HARQ feedback. For example, the UE 115 may transmit a single feedback message based on a joint codebook 530 in a PUCCH resource 520.

In some examples, for HARQ feedback corresponding to multiple TRPs 510, the UE 115 may determine a skipping rule irrespective of TRPs 510. For example, the UE 115 may reduce the size of the joint semi-static HARQ-Ack codebook if the UE 115 is reporting a single bit of ACK/NACK feedback across all of the TRPs 510. As illustrated, the UE 115 is scheduled to transmit feedback for multiple PDSCH reception occasions 515, so the UE 115 may determine a joint codebook 530-*a* when applying the skipping rule for the set of TRPs 510. For example, the UE 115 may refrain from applying the skipping rule, and may transmit a joint HARQ message for the TRPs 510-*a* and 510-*b* using a full-size joint codebook 530-*a* (for example, including dummy NACKs 540 for slots 505-*a* and 505-*c* for the second TRP 510-*b*).

In some other examples, for HARQ feedback corresponding to multiple TRPs 510, the UE 115 may determine a skipping rule per TRP 510. For example, the UE 115 may reduce the size of the joint semi-static HARQ-Ack codebook independently for each TRP 510. As illustrated, the UE 115 may apply the skipping rule for the second TRP 510-*b* (for example, based on the downlink message scheduled for the PDSCH reception occasion 515-*b*) while refraining from applying the skipping rule for the first TRP 510-*a*. As such, the joint codebook 530-*b* may include ACK/NACK feedback 535 for slots 505-*a* and 505-*c* and a dummy NACK 540 for slot 505-*b* for the first TRP 510-*a*, while including just ACK/NACK feedback 535 for slot 505-*b* for the second TRP 510-*b* (and skipping feedback 545 for slots 505-*a* and 505-*c* for the second TRP 510-*b*), reducing the size of the joint codebook 530-*b* from six bits to four bits. In this way, for a particular TRP 510-*b* (i.e., a particular higher layer index), if the UE 115 receives one PDSCH with fallback DCI (and, in some examples, cDAI equal to 1), one SPS release with fallback DCI (and, in some examples, cDAI equal to 1), or one SPS PDSCH, the UE 115 reports one bit for that TRP 510-*b*, but may still report the full semi-static codebook for the other TRPs 510 (for example, the first TRP 510-*a*).

Additionally, or alternatively, if the UE 115 does not receive any DCI messages or SPS PDSCH messages for a particular higher layer index (i.e., a particular TRP 510) for a monitoring occasion, the UE 115 may skip reporting feedback for that TRP 510. For example, if, in slots 505-*a*, 505-*b*, and 505-*c*, the UE 115 receives DCI on a PDCCH in CORESETs associated with the same higher layer index, such as the higher layer index associated with the first TRP 510-*a*, and does not receive DCI on a PDCCH in CORESETs associated with the other higher layer index or SPS PDSCH messages associated with the other higher layer index, the UE 115 may transmit a single dummy NACK 545 for the other higher layer index (for example, corresponding to the TRP 510-*b*) or may skip transmitting HARQ feedback for the other higher layer index. This may reduce the joint codebook 530-*b* to four bits or three bits of ACK/NACK information.

Figure 6:
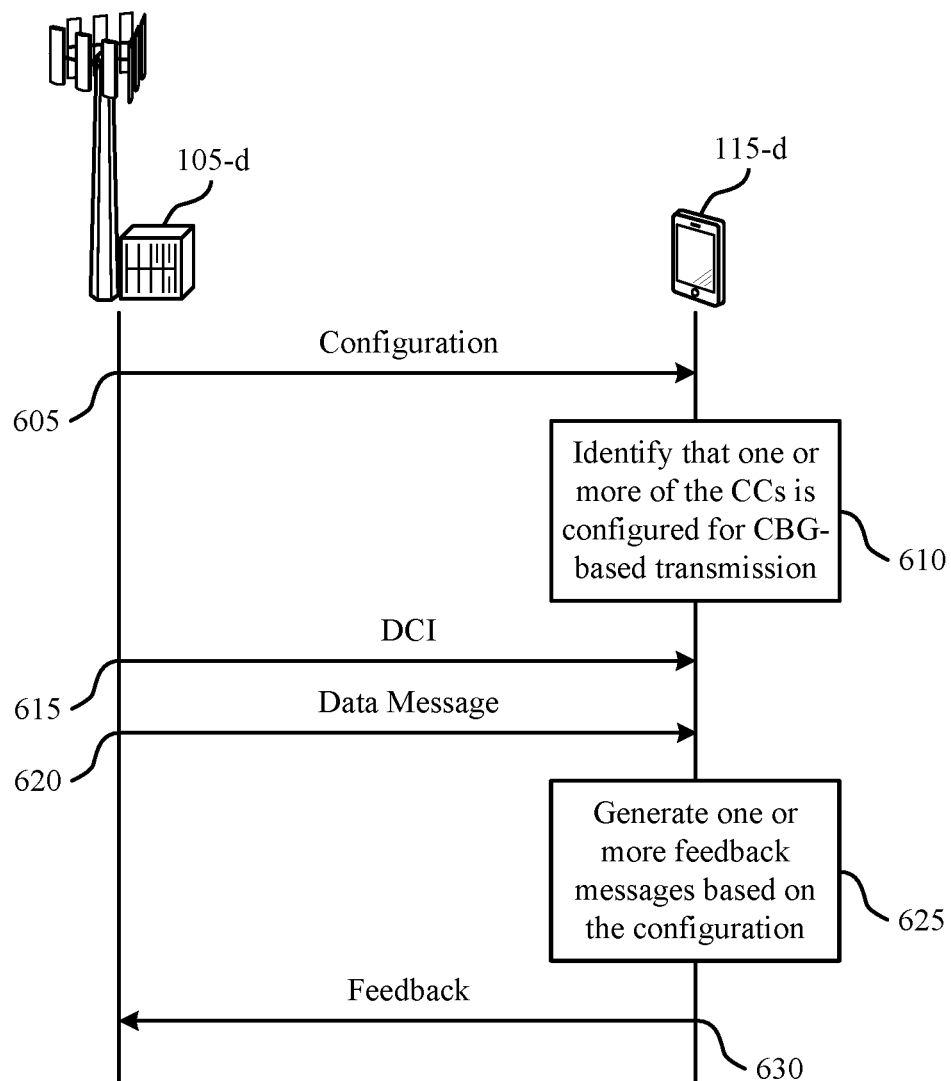
FIGS. 6 and 7 illustrate examples of process flows that support multi-DCI message handling for multiple CORESET groups.

FIG. 6 illustrates an example of a process flow 600 that supports multi-DCI message handling for multiple CORESET groups. The process flow 600 may illustrate an example of CBG-based dynamic HARQ feedback, where a base station 105-*d* may configure a UE 115-*d* for the feedback procedure. The base station 105-*d* and the UE 115-*d* may be examples of the corresponding wireless devices described with reference to FIGS. 1-5. In some examples, the processes described herein with respect to the base station 105-*d* may be performed by multiple base stations 105 (for example, corresponding to multiple TRPs). Alternative examples of the following may be implemented, where some processes are performed in a different order than described or are not performed at all. In some implementations, processes may include additional features not mentioned below, or further processes may be added.

At 605, the base station 105-*d* may transmit, to the UE 115-*d*, a configuration for a downlink control channel monitoring occasion. The configuration may configure the UE 115-*d* with a set of CORESETs, where each CORESET is associated with one of a set of CORESET groups and one of a set of downlink CCs, where one or more of the set of downlink CCs are configured for CBG-based transmission. At 610, based on receiving the configuration, the UE 115-*d* may identify that one or more of the downlink CCs are configured for CBG-based transmission. The CBG-based transmission may be configured per CC or per TRP in a particular CC.

At 615, the base station 105-*d* may transmit one or more DCI messages to the UE 115-*d* in one or more of the CORESETs. In some examples, the DCI may schedule a downlink data transmission (for example, in a PDSCH reception occasion). At 620, the base station 105-*d* may transmit the scheduled downlink data message to the UE 115-*d*. In some implementations, the base station 105-*d* may transmit DCI for a first CORESET group from a first TRP and DCI for a second CORESET group from a second TRP scheduling downlink data messages for each of the TRPs.

At 625, the UE 115-*d* may generate, according to a set of sub-codebooks for a dynamic feedback codebook, one or more feedback messages relating to one or more downlink data messages scheduled by the one or more DCI messages. The set of sub-codebooks may include at least a first sub-codebook associated with TB-based transmission for one or more CORESET groups (for example, corresponding to one or more TRPs) of the set of CORESET groups and a second sub-codebook associated with CBG-based transmission for the one or more CORESET groups of the set of CORESET groups based on an association between the CORESETs, the CORESET groups, the downlink CCs configured for CBG-based transmission, or a combination thereof. For example, if configured for joint feedback, the UE 115-*d* may generate one feedback message according to a first sub-codebook and a second sub-codebook providing HARQ information for both TRPs. The UE 115-*d* may track cDAIs and tDAIs separately or jointly across the TRPs (for example, in addition to tracking the cDAIs and tDAIs separately for TB-based transmission and CBG-based transmission). If configured for separate feedback, the UE 115-*d* may generate separate feedback messages, where a first feedback message is generated according to a first sub-codebook and a second sub-codebook and provides HARQ information for the first TRP and a second feedback message is generated according to a first sub-codebook and a second sub-codebook and provides HARQ information for the second TRP. The UE 115-*d* may track cDAIs and tDAIs separately for the different TRPs (for example, in addition to tracking the cDAIs and tDAIs separately for TB-based transmission and CBG-based transmission). At 630, the UE 115-*d* may transmit the one or more feedback messages to the base station 105-*d*. Based on the feedback, the base station 105-*d* may determine whether to retransmit any information to the UE 115-*d* (for example, based on receiving NACKs for the information).

Figure 7:
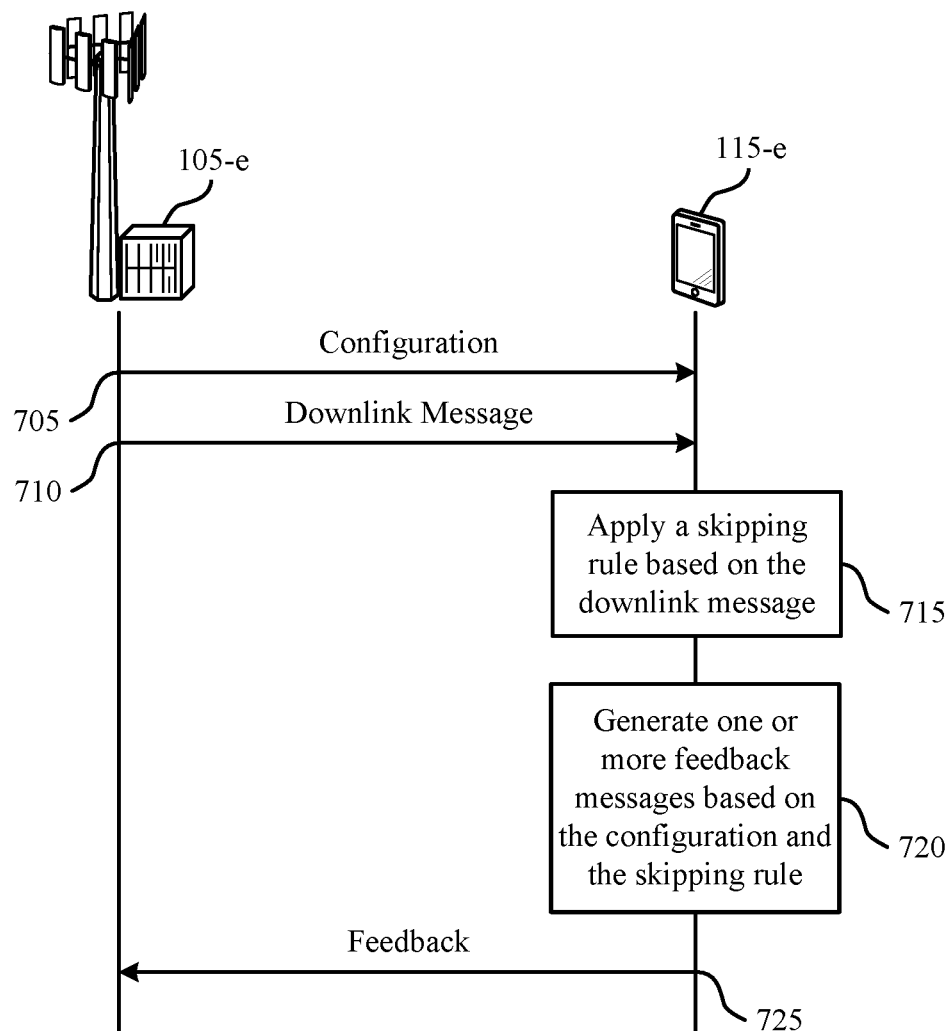

FIG. 7 illustrates an example of a process flow 700 that supports multi-DCI message handling for multiple CORESET groups. The process flow 700 may illustrate an example of skipping rule application for semi-static HARQ feedback, where a base station 105-*e* may configure a UE 115-*e* for the feedback procedure. The base station 105-*e* and the UE 115-*e* may be examples of the corresponding wireless devices described with reference to FIGS. 1-6. In some examples, the processes described herein with respect to the base station 105-*e* may be performed by multiple base stations 105 (for example, corresponding to multiple TRPs). Alternative examples of the following may be implemented, where some processes are performed in a different order than described or are not performed at all. In some implementations, processes may include additional features not mentioned below, or further processes may be added.

At 705, the base station 105-*e* may transmit, to the UE 115-*e*, a configuration for a downlink control channel monitoring occasion. The configuration may configure the UE 115-*e* with a set of CORESETs corresponding to a set of TRPs (for example, a set of CORESET groups), where the configuration indicates for the UE 115-*e* to implement a semi-static feedback codebook.

At 710, the base station 105-*e* may transmit, to the UE 115-*e*, a downlink message associated with a feedback procedure. For example, the base station 105-*e* may transmit the downlink message in a first CORESET of the downlink control channel monitoring occasion corresponding to a first TRP or in a first downlink data occasion corresponding to the first TRP. The first CORESET may correspond to a first CORESET group associated with the first TRP.

At 715, the UE 115-*e* may apply a skipping rule based on the downlink message. For example, the downlink message may be an example of a PDSCH message scheduled with fallback DCI and a cDAI value of 1, a fallback DCI message indicating an SPS release and with a cDAI value of 1, or an SPS PDSCH message. The UE 115-*e* may apply the skipping rule separately for the TRPs or jointly across all TRPs (for example, separately for different CORESET groups or jointly across all CORESET groups). For example, if applied separately, the UE 115-*e* may reduce the size of the semi-static codebook for a particular TRP if the UE 115-*e* has one bit of ACK/NACK feedback to transmit for that particular TRP. If applied jointly, the UE 115-*e* may reduce the size of the entire semi-static codebook if the UE 115-*e* has one bit of ACK/NACK feedback to transmit across all of the TRPs. Additionally, or alternatively, the UE 115-*e* may provide separate or joint feedback for the TRPs.

At 720, the UE 115-*e* may generate, for the feedback procedure, a feedback message including a one-bit acknowledgement indication for the first TRP (for example, for the first CORESET group) based on applying the skipping rule. The generating may be based on the downlink message and the configuration for the downlink control channel monitoring occasion including the set of CORESETs corresponding to the set of TRPs. At 725, the UE 115-*e* may transmit the feedback message including the one-bit acknowledgement indication to the base station 105-*e*. Based on the feedback, the base station 105-*e* may determine whether to retransmit any information to the UE 115-*e*.

Figure 8:
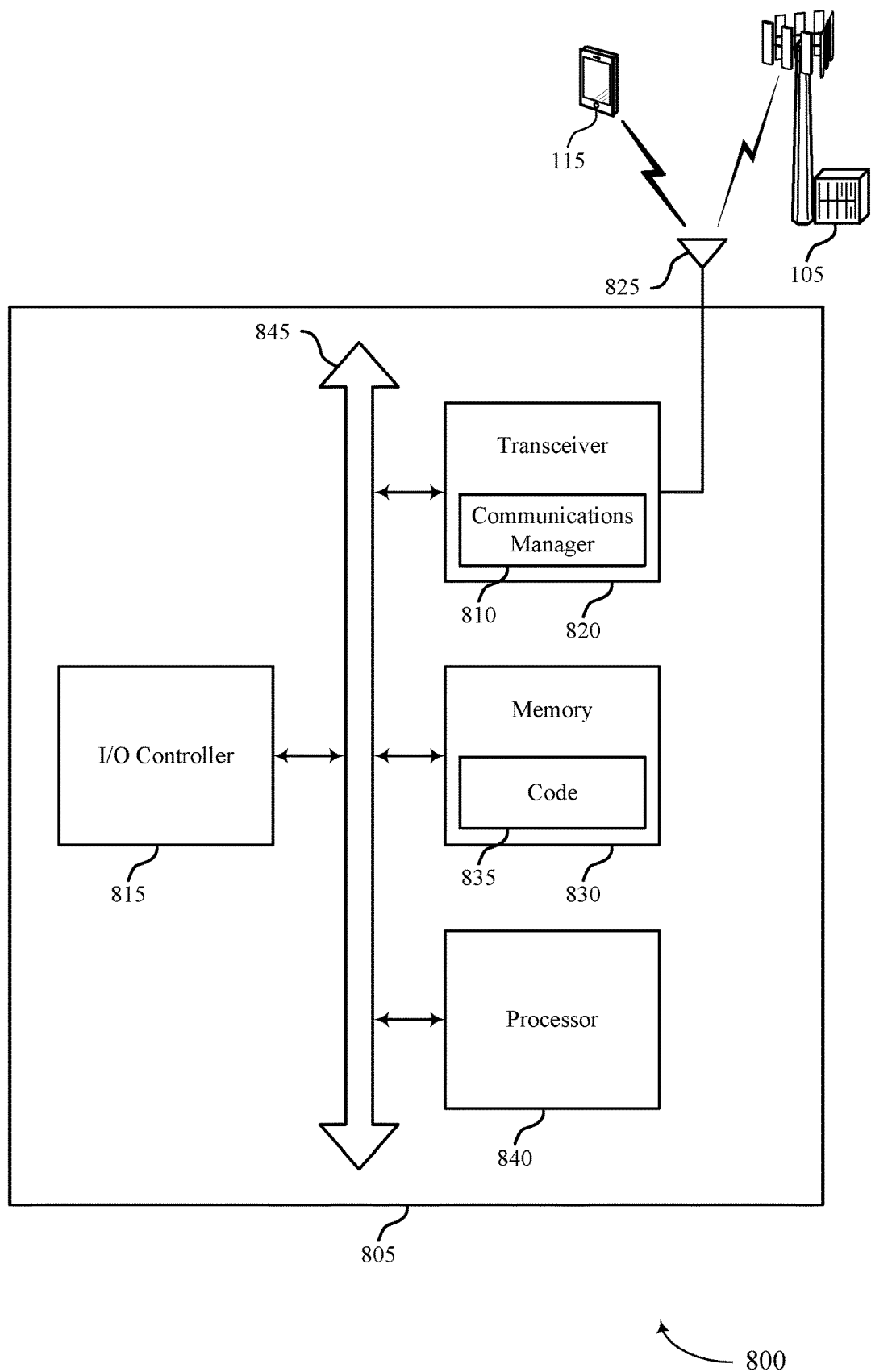
FIGS. 8 and 9 show block diagrams of example devices that support multi-DCI message handling for multiple CORESET groups.

FIG. 8 shows a block diagram 800 of an example device 805 that supports multi-DCI message handling for multiple CORESET groups. The device 805 may be an example of a UE 115. The device 805 may include components for bi-directional voice and data communications including components for transmitting and receiving communications, including a communications manager 810, an input/output (I/O) controller 815, a transceiver 820, an antenna 825, memory 830, and a processor 840. These components may be in electronic communication via one or more buses (such as a bus 845).

In some implementations, the communications manager 810 may receive a configuration for a downlink control channel monitoring occasion including a set of CORESETs, each CORESET being associated with one of a set of CORESET groups and one of a set of downlink CCs. The communications manager 810 may identify (for example, determine or otherwise identify) that one or more of the set of downlink CCs is configured for CBG-based transmission, receive one or more DCI messages in one or more of the CORESETs, and generate, according to a set of sub-codebooks for a dynamic feedback codebook, one or more feedback messages relating to one or more downlink data messages scheduled by the one or more DCI messages. The set of sub-codebooks may include at least a first sub-codebook associated with TB-based transmission for one or more CORESET groups of the set of CORESET groups and a second sub-codebook associated with CBG-based transmission for the one or more CORESET groups of the set of CORESET groups based on an association between the set of CORESETs, the set of CORESET groups, the one or more of the set of downlink CCs configured for CBG-based transmission, or a combination thereof. The communications manager 810 may transmit the one or more feedback messages. Additionally, or alternatively, the communications manager 810 may receive a configuration for a downlink control channel monitoring occasion including multiple CORESETs, each CORESET being associated with one of a set of multiple CORESET groups and one of a set of multiple downlink CCs, and the configuration indicating joint HARQ feedback for the set of multiple CORESET groups. The communications manager 810 may identify (for example, determine or otherwise identify) that one or more of the set of downlink CCs is configured for CBG-based transmission, receive, in a first CORESET of the downlink control channel monitoring occasion corresponding to a first CORESET group, a first DCI message scheduling a first downlink data message, and receive, in a second CORESET of the downlink control channel monitoring occasion corresponding to a second CORESET group, a second DCI message scheduling a second downlink data message. The communications manager 810 may further generate, according to a set of sub-codebooks for a dynamic feedback codebook, a joint feedback message for the first downlink data message corresponding to the first CORESET group and the second downlink data message corresponding to the second CORESET group based on the configuration indicating joint HARQ feedback, the set of sub-codebooks including a first sub-codebook associated with TB-based transmission for the first CORESET group and the second CORESET group and a second sub-codebook associated with CBG-based transmission for the first CORESET group and the second CORESET group based on the one or more of the set of downlink CCs configured for CBG-based transmission. The communications manager 810 may transmit the joint feedback message.

Additionally, or alternatively, the communications manager 810 may receive a configuration for a downlink control channel monitoring occasion including a set of CORESETs corresponding to a set of CORESET groups, where the configuration indicates to implement a semi-static feedback codebook, and may receive, in a first CORESET of the downlink control channel monitoring occasion corresponding to a first CORESET group, in a first downlink data or SPS occasion corresponding to the first CORESET group, or in both, a downlink message associated with a feedback procedure. The communications manager 810 may generate, for the feedback procedure, a feedback message including a one-bit acknowledgement indication (for example, a one-bit ACK/NACK indication) for the first CORESET group based on the downlink message and the configuration for the downlink control channel monitoring occasion including the set of CORESETs corresponding to the set of CORESET groups and may transmit the feedback message including the one-bit acknowledgement indication.

The I/O controller 815 may manage input and output signals for the device 805. The I/O controller 815 also may manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In some other examples, the I/O controller 815 may represent or interact with a modem, a keyboard, a mouse, a touchscreen, or a similar device. In some examples, the I/O controller 815 may be implemented as part of a processor. In some implementations, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas.

In some examples, the wireless device may include a single antenna 825. However, in some other examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic I/O system (BIOS) which may control basic hardware or software operation such as the interaction with peripheral components or devices.

The processor 840 may include an intelligent hardware device (such as a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 840 may be configured to operate a memory array using a memory controller. In some other examples, a memory controller may be integrated into the processor 840. The processor 840 may be configured to execute computer-readable instructions stored in a memory 830 to cause the device 805 to perform various functions, such as functions or tasks supporting multi-DCI message handling for multiple TRPs.

In some implementations, the processor 840 may be a component of a processing system. A processing system may generally refer to a system or series of machines or components that receives inputs and processes the inputs to produce a set of outputs (which may be passed to other systems or components of, for example, a UE 115). For example, a processing system of a UE 115 may refer to a system including the various other components or subcomponents of the UE 115.

The processing system of the UE 115 may interface with other components of the UE 115, and may process information received from other components (such as inputs or signals), output information to other components, etc. For example, a chip or modem of the UE 115 may include a processing system, a first interface to receive or obtain information, and a second interface to output, transmit, or provide information. In some implementations, the first interface may refer to an interface between the processing system of the chip or modem and a receiver, such that the UE 115 may receive information or signal inputs, and the information may be passed to the processing system. In some implementations, the second interface may refer to an interface between the processing system of the chip or modem and a transmitter, such that the UE 115 may transmit information output from the chip or modem. A person having ordinary skill in the art will readily recognize that the second interface also, or alternatively, may obtain or receive information or signal inputs, and the first interface also, or alternatively, may output, transmit, or provide information.

The code 835 may include instructions to implement aspects of the present disclosure, including instructions to support wireless communications. The code 835 may be stored in a non-transitory computer-readable medium such as system memory or other type of memory. In some implementations, the code 835 may not be directly executable by the processor 840 but may cause a computer (for example, when compiled and executed) to perform functions described herein.

Figure 9:
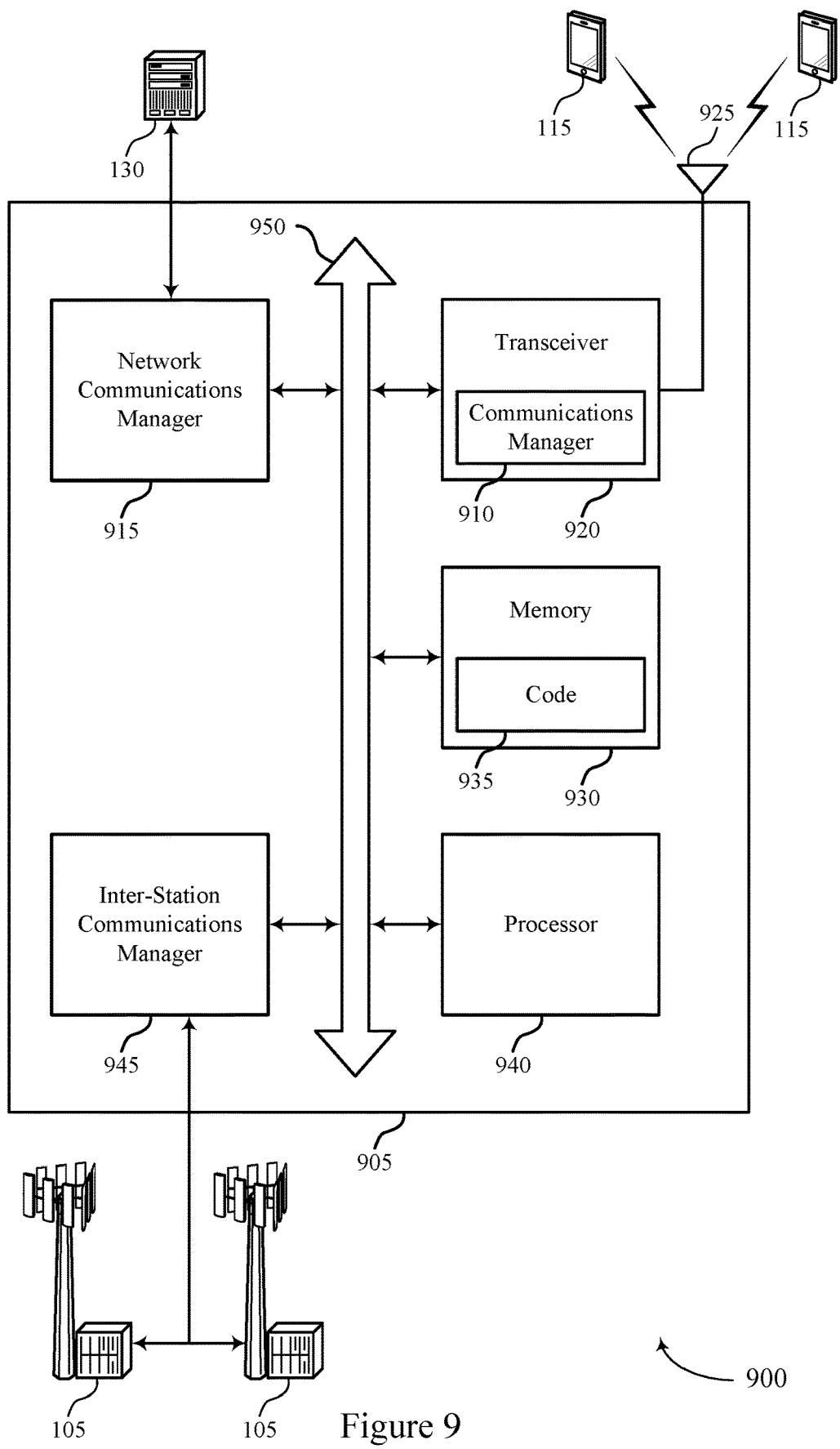

FIG. 9 shows a block diagram 900 of an example device 905 that supports multi-DCI message handling for multiple CORESET groups. The device 905 may be an example of or include the components of a base station 105 or a set of inter-connected base stations 105 for a network. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945.

These components may be in electronic communication via one or more buses (such as a bus 950).

In some implementations, the communications manager 910 may transmit, to a UE 115, a configuration for a downlink control channel monitoring occasion including a set of CORESETs, each CORESET being associated with one of a set of CORESET groups and one of a set of downlink CCs, where one or more of the set of downlink CCs is configured for CBG-based transmission. The communications manager 910 may transmit one or more DCI messages in one or more of the CORESETs and may receive, from the UE 115, one or more feedback messages relating to one or more downlink data messages scheduled by the DCI, the one or more feedback messages being in accordance with a set of sub-codebooks for a dynamic feedback codebook, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups, and based on the association between the set of CORESETs, the set of CORESET groups, the set of downlink CCs configured for CBG-based transmission, or a combination thereof.

Additionally, or alternatively, the communications manager 910 may transmit, to a UE 115, a configuration for a downlink control channel monitoring occasion including a set of CORESETs corresponding to a set of CORESET groups, where the configuration indicates for the UE 115 to implement a semi-static feedback codebook, and may transmit, to the UE 115 in a first CORESET of the downlink control channel monitoring occasion corresponding to a first CORESET group, in a first downlink data or SPS occasion corresponding to the first CORESET group, or in both, a downlink message associated with a feedback procedure. The communications manager 910 may receive, from the UE 115 and for the feedback procedure, a feedback message including a one-bit acknowledgement indication (for example, a one-bit ACK/NACK indicator) for the first CORESET group based on the downlink message and the configuration for the downlink control channel monitoring occasion including the set of CORESETs corresponding to the set of CORESET groups.

The network communications manager 915 may manage communications with the core network 130 (for example, via one or more wired backhaul links). The network communications manager 915 may manage the transfer of data communications for client devices, such as one or more UEs 115.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 also may include a modem to modulate the packets and provide the modulated packets to the antennas for transmission, and to demodulate packets received from the antennas.

In some examples, the wireless device may include a single antenna 925. However, in some other examples the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor 940, cause the device to perform various functions described herein. In some examples, the memory 930 may contain, among other things, a BIOS which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 940 may be configured to operate a memory array using a memory controller. In some examples, a memory controller may be integrated into processor 940. The processor 940 may be configured to execute computer-readable instructions stored in the memory 930 to cause the device 905 to perform various functions, such as functions or tasks supporting multi-DCI message handling for multiple TRPs.

In some implementations, the processor 940 may be a component of a processing system. A processing system may generally refer to a system or series of machines or components that receives inputs and processes the inputs to produce a set of outputs (which may be passed to other systems or components of, for example, a base station 105). For example, a processing system of a base station 105 may refer to a system including the various other components or subcomponents of the base station 105.

The processing system of the base station 105 may interface with other components of the base station 105 and may process information received from other components (such as inputs or signals), output information to other components, etc. For example, a chip or modem of the base station 105 may include a processing system, a first interface to receive or obtain information, and a second interface to output, transmit, or provide information. In some implementations, the first interface may refer to an interface between the processing system of the chip or modem and a receiver, such that the base station 105 may receive information or signal inputs, and the information may be passed to the processing system. In some implementations, the second interface may refer to an interface between the processing system of the chip or modem and a transmitter, such that the base station 105 may transmit information output from the chip or modem. A person having ordinary skill in the art will readily recognize that the second interface also, or alternatively, may obtain or receive information or signal inputs, and the first interface also, or alternatively, may output, transmit, or provide information.

The inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer, when compiled and executed, to perform functions described herein.

Figure 10:
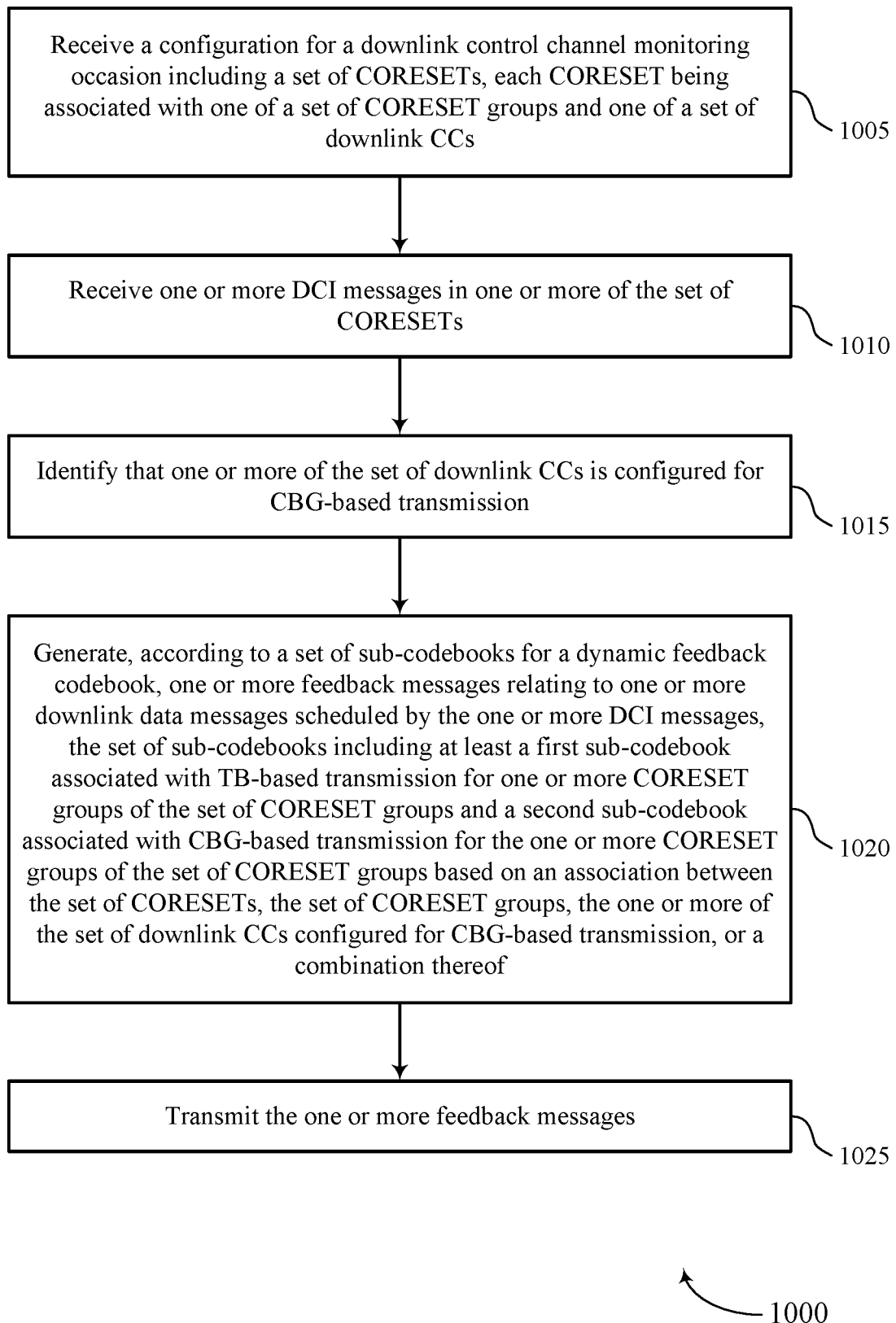
FIGS. 10-13 show flowcharts illustrating example methods that support multi-DCI message handling for multiple CORESET groups.

FIG. 10 shows a flowchart illustrating an example method 1000 that supports multi-DCI message handling for multiple CORESET groups. The operations of the method 1000 may be implemented by a UE 115 or its components as described herein. For example, the operations of the method 1000 may be performed by a communications manager as described with reference to FIG. 8. In some examples, a UE 115 may execute a set of instructions to control the functional elements of the UE 115 to perform the functions described below. Additionally, or alternatively, a UE 115 may perform aspects of the functions described below using special-purpose hardware.

At 1005, the UE 115 may receive a configuration for a downlink control channel monitoring occasion including a set of CORESETs, each CORESET being associated with one of a set of CORESET groups and one of a set of downlink CCs. The operations of 1005 may be performed according to the methods described herein.

At 1010, the UE 115 may receive one or more DCI messages in one or more of the CORESETs. The operations of 1010 may be performed according to the methods described herein.

At 1015, the UE 115 may identify that one or more of the set of downlink CCs is configured for CBG-based transmission. The operations of 1015 may be performed according to the methods described herein.

At 1020, the UE 115 may generate, according to a set of sub-codebooks for a dynamic feedback codebook, one or more feedback messages relating to one or more downlink data messages scheduled by the one or more DCI messages, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups based on an association between the set of CORESETs, the set of CORESET groups, the one or more of the set of downlink CCs configured for CBG-based transmission, or a combination thereof. The operations of 1020 may be performed according to the methods described herein.

At 1025, the UE 115 may transmit the one or more feedback messages. The operations of 1025 may be performed according to the methods described herein.

Figure 11:
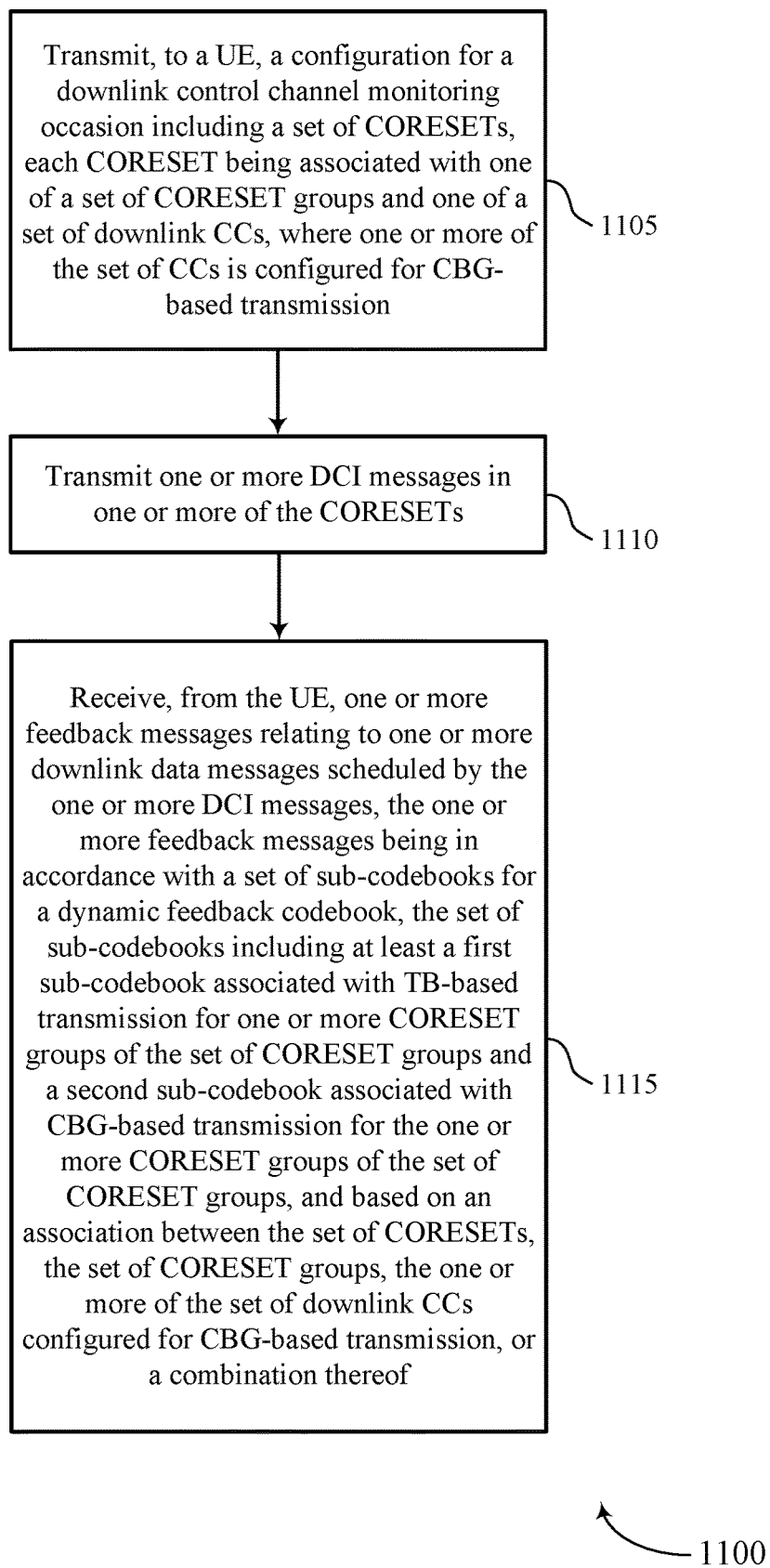

FIG. 11 shows a flowchart illustrating an example method 1100 that supports multi-DCI message handling for multiple CORESET groups. The operations of the method 1100 may be implemented by a base station 105 or its components as described herein. For example, the operations of the method 1100 may be performed by a communications manager as described with reference to FIG. 9. In some examples, a base station 105 may execute a set of instructions to control the functional elements of the base station 105 to perform the functions described below. Additionally, or alternatively, a base station 105 may perform aspects of the functions described below using special-purpose hardware.

At 1105, the base station 105 may transmit, to a UE 115, a configuration for a downlink control channel monitoring occasion including a set of CORESETs, each CORESET being associated with one of a set of CORESET groups and one of a set of downlink CCs, where one or more of the set of downlink CCs is configured for CBG-based transmission. The operations of 1105 may be performed according to the methods described herein.

At 1110, the base station 105 may transmit one or more DCI messages in one or more of the CORESETs. The operations of 1110 may be performed according to the methods described herein.

At 1115, the base station 105 may receive, from the UE 115, one or more feedback messages relating to one or more downlink data messages scheduled by the DCI, the one or more feedback messages being in accordance with a set of sub-codebooks for a dynamic feedback codebook, the set of sub-codebooks including at least a first sub-codebook associated with TB-based transmission for one or more CORESET groups of the set of CORESET groups and a second sub-codebook associated with CBG-based transmission for the one or more CORESET groups of the set of CORESET groups, and based on an association between the set of CORESETs, the set of CORESET groups, the one or more of the set of downlink CCs configured for CBG-based transmission, or a combination thereof. The operations of 1115 may be performed according to the methods described herein.

Figure 12:
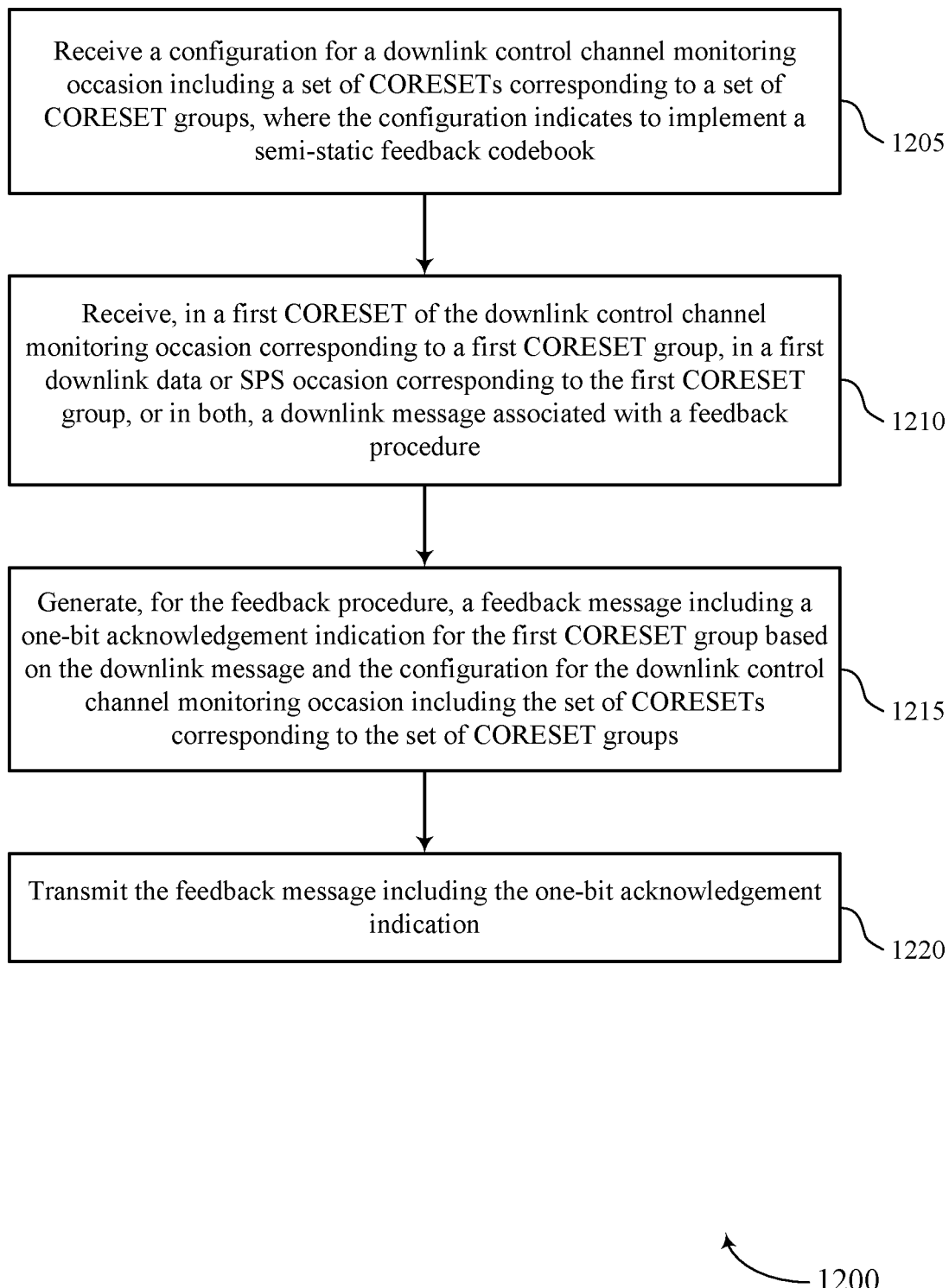

FIG. 12 shows a flowchart illustrating an example method 1200 that supports multi-DCI message handling for multiple CORESET groups. The operations of the method 1200 may be implemented by a UE 115 or its components as described herein. For example, the operations of the method 1200 may be performed by a communications manager as described with reference to FIG. 8. In some examples, a UE 115 may execute a set of instructions to control the functional elements of the UE 115 to perform the functions described below. Additionally, or alternatively, a UE 115 may perform aspects of the functions described below using special-purpose hardware.

At 1205, the UE 115 may receive a configuration for a downlink control channel monitoring occasion including a set of CORESETs corresponding to a set of CORESET groups, where the configuration indicates to implement a semi-static feedback codebook. The operations of 1205 may be performed according to the methods described herein.

At 1210, the UE 115 may receive, in a first CORESET of the downlink control channel monitoring occasion corresponding to a first CORESET group, in a first downlink data or SPS occasion corresponding to the first CORESET group, or in both, a downlink message associated with a feedback procedure. The operations of 1210 may be performed according to the methods described herein.

At 1215, the UE 115 may generate, for the feedback procedure, a feedback message including a one-bit acknowledgement indication for the first CORESET group based on the downlink message and the configuration for the downlink control channel monitoring occasion including the set of CORESETs corresponding to the set of CORESET groups. The operations of 1215 may be performed according to the methods described herein.

At 1220, the UE 115 may transmit the feedback message including the one-bit acknowledgement indication. The operations of 1220 may be performed according to the methods described herein.

Figure 13:
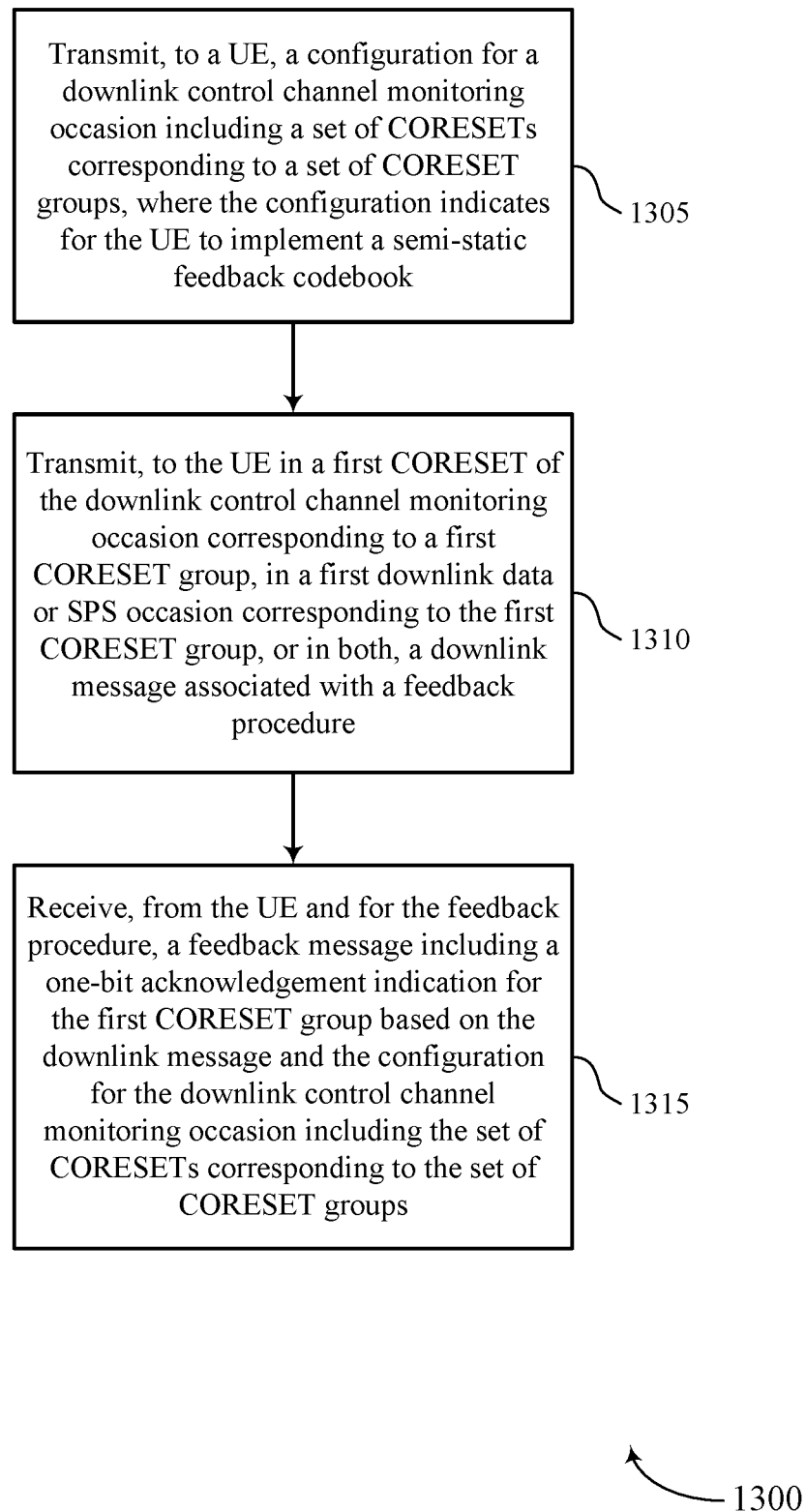

FIG. 13 shows a flowchart illustrating an example method 1300 that supports multi-DCI message handling for multiple CORESET groups. The operations of the method 1300 may be implemented by a base station 105 or its components as described herein. For example, the operations of the method 1300 may be performed by a communications manager as described with reference to FIG. 9. In some examples, a base station 105 may execute a set of instructions to control the functional elements of the base station 105 to perform the functions described below. Additionally, or alternatively, a base station 105 may perform aspects of the functions described below using special-purpose hardware.

At 1305, the base station 105 may transmit, to a UE 115, a configuration for a downlink control channel monitoring occasion including a set of CORESETs corresponding to a set of CORESET groups, where the configuration indicates for the UE 115 to implement a semi-static feedback codebook. The operations of 1305 may be performed according to the methods described herein.

At 1310, the base station 105 may transmit, to the UE 115 in a first CORESET of the downlink control channel monitoring occasion corresponding to a first CORESET group, in a first downlink data or SPS occasion corresponding to the first CORESET group, or in both, a downlink message associated with a feedback procedure. The operations of 1310 may be performed according to the methods described herein.

At 1315, the base station 105 may receive, from the UE 115 and for the feedback procedure, a feedback message including a one-bit acknowledgement indication for the first CORESET group based on the downlink message and the configuration for the downlink control channel monitoring occasion including the set of CORESETs corresponding to the set of CORESET groups. The operations of 1315 may be performed according to the methods described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, electrically erasable programmable ROM (EEPROM), compact disc (CD)-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. A user equipment (UE) for wireless communications, comprising:
a processing system; and
an interface configured to:
obtain a configuration for a downlink control channel monitoring occasion comprising a plurality of control resource sets (CORESETs), each CORESET being associated with one of a plurality of CORESET groups and one of a plurality of downlink component carriers, wherein the configuration is associated with a semi-static feedback codebook;
obtain a downlink message associated with a feedback procedure in a first CORESET of the downlink control channel monitoring occasion corresponding to a first CORESET group, in a first semi-persistent scheduling occasion corresponding to the first CORESET group, or in both; and
output a feedback message comprising a one-bit acknowledgement indication for the first CORESET group associated with the downlink message and the configuration for the downlink control channel monitoring occasion comprising the plurality of CORESETs, wherein inclusion of the one-bit acknowledgement indication in the feedback message is in accordance with a first skipping rule for skipping feedback, the first skipping rule associated with the downlink message being scheduled via a fallback downlink control information message with a counter downlink assignment index value of one.

2. The UE of claim 1, wherein the downlink message comprises a first downlink message, and wherein the interface is further configured to:
obtain, in a second CORESET of the downlink control channel monitoring occasion corresponding to a second CORESET group, in a second semi-persistent scheduling occasion corresponding to the second CORESET group, or in both, a second downlink message associated with the feedback procedure.

3. The UE of claim 2, wherein the interface is further configured to:
output separate hybrid automatic repeat request feedback for the first downlink message corresponding to the first CORESET group and the second downlink message corresponding to the second CORESET group associated with the configuration.

4. The UE of claim 3, wherein the feedback message comprises a first hybrid automatic repeat request message corresponding to the first CORESET group, and wherein the processing system is configured to:
apply the first skipping rule for the first CORESET group, wherein the first hybrid automatic repeat request message comprises the one-bit acknowledgement indication for the first CORESET group associated with the first skipping rule; and
wherein the interface is further configured to:
output a second hybrid automatic repeat request message in a second uplink resource based at least in part on determining whether to apply a second skipping rule for the second CORESET group, wherein the first hybrid automatic repeat request message is outputted in a first uplink resource different from the second uplink resource.

5. The UE of claim 2, wherein the interface is further configured to:
output joint hybrid automatic repeat request feedback for the first downlink message corresponding to the first CORESET group and the second downlink message corresponding to the second CORESET group associated with the configuration.

6. The UE of claim 5, wherein the processing system is configured to:
apply the first skipping rule for the first CORESET group, wherein the feedback message comprises the one-bit acknowledgement indication for the first CORESET group associated with the first skipping rule.

7. The UE of claim 6, wherein the processing system is further configured to:
apply a second skipping rule for the second CORESET group associated with the second downlink message, wherein the feedback message comprises a second one-bit acknowledgement indication for the second CORESET group associated with the second skipping rule.

8. The UE of claim 6, wherein the processing system is further configured to:
selectively apply a second skipping rule for the second CORESET group associated with the second downlink message, wherein the feedback message is associated with the semi-static feedback codebook.

9. The UE of claim 1, wherein the processing system is configured to:
apply the first skipping rule associated with the downlink message comprising a semi-persistent scheduling release, a semi-persistent scheduled data reception, or a combination thereof, wherein the feedback message is associated with the first skipping rule.

10. The UE of claim 9, wherein the downlink message is an only downlink message associated with the feedback message based at least in part on application of the first skipping rule.

11. A method for wireless communications at a user equipment (UE), comprising:
receiving a configuration for a downlink control channel monitoring occasion comprising a plurality of control resource sets (CORESETs), each CORESET being associated with one of a plurality of CORESET groups and one of a plurality of downlink component carriers, wherein the configuration is associated with a semi-static feedback codebook; and
receiving a downlink message associated with a feedback procedure in a first CORESET of the downlink control channel monitoring occasion corresponding to a first CORESET group, in a first semi-persistent scheduling occasion corresponding to the first CORESET group, or in both; and
transmitting a feedback message comprising a one-bit acknowledgement indication for the first CORESET group associated with the downlink message and the configuration for the downlink control channel monitoring occasion comprising the plurality of CORESETs, wherein inclusion of the one-bit acknowledgement indication in the feedback message is in accordance with a first skipping rule for skipping feedback, the first skipping rule associated with the downlink message being scheduled via a fallback downlink control information message with a counter downlink assignment index value of one.

12. The method of claim 11, wherein the downlink message comprises a first downlink message, the method further comprising:
receiving, in a second CORESET of the downlink control channel monitoring occasion corresponding to a second CORESET group, in a second semi-persistent scheduling occasion corresponding to the second CORESET group, or in both, a second downlink message associated with the feedback procedure.

13. The method of claim 12, further comprising:
transmitting separate hybrid automatic repeat request feedback for the first downlink message corresponding to the first CORESET group and the second downlink message corresponding to the second CORESET group associated with the configuration.

14. The method of claim 13, wherein the feedback message comprises a first hybrid automatic repeat request message corresponding to the first CORESET group, the method further comprising:
applying the first skipping rule for the first CORESET group, wherein the first hybrid automatic repeat request message comprises the one-bit acknowledgement indication for the first CORESET group associated with the first skipping rule; and
transmitting a second hybrid automatic repeat request message in a second uplink resource based at least in part on determining whether to apply a second skipping rule for the second CORESET group, wherein the first hybrid automatic repeat request message is transmitted in a first uplink resource different from the second uplink resource.

15. The method of claim 12, further comprising:
transmitting joint hybrid automatic repeat request feedback for the first downlink message corresponding to the first CORESET group and the second downlink message corresponding to the second CORESET group associated with the configuration.

16. The method of claim 15, further comprising:
applying a first skipping rule for the first CORESET group, wherein the feedback message comprises the one-bit acknowledgement indication for the first CORESET group associated with the first skipping rule.

17. The method of claim 16, further comprising:
applying a second skipping rule for the second CORESET group associated with the second downlink message, wherein the feedback message comprises a second one-bit acknowledgement indication for the second CORESET group associated with the second skipping rule.

18. The method of claim 16, further comprising:
selectively applying a second skipping rule for the second CORESET group associated with the second downlink message, wherein the feedback message is associated with the semi-static feedback codebook.

19. The method of claim 11, further comprising:
applying the first skipping rule associated with the downlink message comprising a semi-persistent scheduling release, a semi-persistent scheduled data reception, or a combination thereof, wherein the feedback message is associated with the first skipping rule.

20. The method of claim 19, wherein the downlink message is an only downlink message associated with the feedback message based at least in part on application of the first skipping rule.

21. A user equipment (UE) for wireless communications, comprising:
means for obtaining a configuration for a downlink control channel monitoring occasion comprising a plurality of control resource sets (CORESETs), each CORESET being associated with one of a plurality of CORESET groups and one of a plurality of downlink component carriers, wherein the configuration is associated with a semi-static feedback codebook;
means for obtaining a downlink message associated with a feedback procedure in a first CORESET of the downlink control channel monitoring occasion corresponding to a first CORESET group, in a first semi-persistent scheduling occasion corresponding to the first CORESET group, or in both; and
means for outputting a feedback message comprising a one-bit acknowledgement indication for the first CORESET group associated with the downlink message and the configuration for the downlink control channel monitoring occasion comprising the plurality of CORESETs, wherein inclusion of the one-bit acknowledgement indication in the feedback message is in accordance with a first skipping rule for skipping feedback, the first skipping rule associated with the downlink message being scheduled via a fallback downlink control information message with a counter downlink assignment index value of one.

22. The UE of claim 21, wherein the downlink message comprises a first downlink message, the apparatus further comprising:
means for obtaining, in a second CORESET of the downlink control channel monitoring occasion corresponding to a second CORESET group, in a second semi-persistent scheduling occasion corresponding to the second CORESET group, or in both, a second downlink message associated with the feedback procedure.

23. The UE of claim 22, the apparatus further comprising:
means for outputting separate hybrid automatic repeat request feedback for the first downlink message corresponding to the first CORESET group and the second downlink message corresponding to the second CORESET group associated with the configuration.

24. The UE of claim 23, wherein the feedback message comprises a first hybrid automatic repeat request message corresponding to the first CORESET group, the apparatus further comprising:
means for applying the first skipping rule for the first CORESET group, wherein the first hybrid automatic repeat request message comprises the one-bit acknowledgement indication for the first CORESET group associated with the first skipping rule; and
means for outputting a second hybrid automatic repeat request message in a second uplink resource based at least in part on determining whether to apply a second skipping rule for the second CORESET group, wherein the first hybrid automatic repeat request message is outputted in a first uplink resource different from the second uplink resource.

25. The UE of claim 22, the apparatus further comprising:
means for outputting joint hybrid automatic repeat request feedback for the first downlink message corresponding to the first CORESET group and the second downlink message corresponding to the second CORESET group associated with the configuration.

26. The UE of claim 25, the apparatus further comprising:
means for applying the first skipping rule for the first CORESET group, wherein the feedback message comprises the one-bit acknowledgement indication for the first CORESET group associated with the first skipping rule.

27. The UE of claim 26, the apparatus further comprising:
means for applying a second skipping rule for the second CORESET group associated with the second downlink message, wherein the feedback message comprises a second one-bit acknowledgement indication for the second CORESET group associated with the second skipping rule.

28. The UE of claim 26, the apparatus further comprising:
means for selectively applying a second skipping rule for the second CORESET group associated with the second downlink message, wherein the feedback message is associated with the semi-static feedback codebook.

29. The UE of claim 21, the apparatus further comprising:
means for applying the first skipping rule associated with the downlink message comprising a semi-persistent scheduling release, a semi-persistent scheduled data reception, or a combination thereof, wherein the feedback message is associated with the first skipping rule, and wherein the downlink message is an only downlink message associated with the feedback message based at least in part on application of the first skipping rule.

30. A non-transitory computer-readable medium storing code for wireless communication at a user equipment, the code comprising instructions executable by a processor to:
obtain a configuration for a downlink control channel monitoring occasion comprising a plurality of control resource sets (CORESETs), each CORESET being associated with one of a plurality of CORESET groups and one of a plurality of downlink component carriers, wherein the configuration is associated with a semi-static feedback codebook;
obtain a downlink message associated with a feedback procedure in a first CORESET of the downlink control channel monitoring occasion corresponding to a first CORESET group, in a first semi-persistent scheduling occasion corresponding to the first CORESET group, or in both; and
output a feedback message comprising a one-bit acknowledgement indication for the first CORESET group associated with the downlink message and the configuration for the downlink control channel monitoring occasion comprising the plurality of CORESETs, wherein inclusion of the one-bit acknowledgement indication in the feedback message is in accordance with a first skipping rule for skipping feedback, the first skipping rule associated with the downlink message being scheduled via a fallback downlink control information message with a counter downlink assignment index value of one.

* * * * *